(12) United States Patent
Kuze et al.

(10) Patent No.: US 6,316,575 B1
(45) Date of Patent: Nov. 13, 2001

(54) PROCESSES FOR THE PRODUCTION OF POLYCARBONATE

(75) Inventors: Shigeki Kuze; Kenji Tanaka, both of Ichihara; Akiko Yabe, Tokyo; Misako Ishikawa, Ichihara; Naoko Seino, Tokuyama, all of (JP)

(73) Assignee: Idemitsu Kosan Co., Ltd., Tokyo (JP)

(*) Notice: Subject to any disclaimer, the term of this patent is extended or adjusted under 35 U.S.C. 154(b) by 0 days.

(21) Appl. No.: 09/147,436

(22) PCT Filed: Jun. 19, 1997

(86) PCT No.: PCT/JP97/02107

§ 371 Date: Dec. 23, 1998

§ 102(e) Date: Dec. 23, 1998

(87) PCT Pub. No.: WO97/49752

PCT Pub. Date: Dec. 31, 1997

(30) Foreign Application Priority Data

Jun. 26, 1996 (JP) .................................................. 8-165632
Jul. 31, 1996 (JP) .................................................. 8-201460
Jul. 31, 1996 (JP) .................................................. 8-201461
Jul. 31, 1996 (JP) .................................................. 8-201462

(51) Int. Cl.[7] .................................................. C08G 64/00
(52) U.S. Cl. .................................................. 528/196; 528/198
(58) Field of Search .................................................. 528/196, 198

(56) References Cited

FOREIGN PATENT DOCUMENTS 0 807 657    11/1997  (EP) .
06271659A  *  9/1994  (JP) .

* cited by examiner

Primary Examiner—Terressa M. Boykin

(57) ABSTRACT

Provided are a method for producing polycarbonates through melt transesterification, wherein is used a polymerization catalyst comprising a phosphorus-containing basic compound and a quaternary phosphonium salt having a specific structure; and a method for producing polycarbonates, which comprises pre-polymerization to prepare polycarbonate prepolymers followed by final polymerization of said prepolymers in a solid phase or in a swollen solid phase to produce the products, polycarbonates, and in which (1) a catalyst comprising a phosphorus-containing basic compound and a quaternary phosphonium salt having a specific structure is used in the pre-polymerization and in the final polymerization, or (2) a catalyst of a tri-valent or penta-valent phosphorus compound or a nitrogen-containing organic basic compound is used in the final polymerization, or (3) the final polymerization is effected in a vapor-phase atmosphere having an oxygen concentration of not larger than 2 ppm. In those methods, high-quality polycarbonates having good appearance, high heat resistance and high hydrolysis resistance are produced extremely efficiently.

24 Claims, No Drawings

PROCESSES FOR THE PRODUCTION OF POLYCARBONATE

TECHNICAL FIELD

The present invention relates to a method for producing polycarbonates. More precisely, it relates to an efficient method for producing high-quality polycarbonates, which comprises transesterification of, for example, dihydroxy compounds with dicarbonates to give polycarbonates in the presence of a specific polymerization catalyst, or comprises solid-phase polymerization of polycarbonate prepolymers having been prepared through transesterification or interfacial polycondensation, in the presence of a specific polymerization catalyst, or comprises solid-phase polymerization of such polycarbonate prepolymers in oxygen-poor conditions.

BACKGROUND ART

Polycarbonates are engineering plastics having good transparency, heat resistance and impact resistance, and are now widely used in the field of electric and electronic appliances, in the field of automobiles, in the field of optical instruments, and in other various industrial fields.

For producing such polycarbonates, known are a method of directly reacting an aromatic dihydroxy compound such as bisphenol A or the like with phosgene (interfacial polycondensation), and a method of transesterifying an aromatic dihydroxy compound such as bisphenol A or the like with a dicarbonate such as diphenyl carbonate or the like in a melt or solid phase (melt polymerization, solid-phase polymerization).

Of the conventional polymerization methods for producing polycarbonates, the interfacial polycondensation method that requires methylene chloride is problematic in that the quality of the products is not good as they often contain chlorine. This is because the products, polycarbonates may contain methylene chloride, but removing methylene chloride from the products is extremely difficult.

On the other hand, the melt polymerization method will be better than the interfacial polycondensation method, as being inexpensive. However, it generally requires long-term reaction at high temperatures falling between 280° C. and 310° C., and its serious problem is that the polycarbonates obtained are inevitably colored. In addition, another problem with the method is that high-molecular polycarbonates could not be obtained.

In order to solve these problems, some proposals were made for transesterification to give polycarbonates. For example, one was to use a specific catalyst (see Japanese Patent Application Laid-Open (JP-A) Hei-6-256479); and another was to add an antioxidant to the reaction system in the latter stage of reaction. Still another was to control and lower the oxygen concentration in the melt transesterification system to a predetermined lower level, thereby improving the hydrolysis resistance and even the color tone of the products, polycarbonates (see JP-A Hei-7-26010). However, all those conventional techniques are still unsatisfactory for solving the problems with polycarbonates which are deteriorated under heat to have poor quality in high-temperature and high-humidity environments, and which are unfavorably colored. In particular, the conventional polycarbonates, if desired to be used in optical materials, could not still have satisfactory properties.

DISCLOSURE OF THE INVENTION

The object of the present invention is to solve the problems with polycarbonates produced through conventional transesterification, and to provide an efficient method for producing polycarbonates of high quality.

We, the present inventors have assiduously studied for the purpose of attaining the object noted above, and, as a result, have found that polycarbonates of high quality can be produced in melt transesterification in the presence of a specific catalyst, or in solid-phase or swollen solid-phase polymerization of polycarbonate prepolymers ("polycarbonate prepolymers" may be hereinafter simply referred to as "prepolymers") in the presence of a specific catalyst, or in solid-phase or swollen solid-phase polymerization of prepolymers in an oxygen-poor vapor-phase atmosphere having an oxygen concentration of not larger than 2 ppm, and that the polycarbonates thus produced satisfy the object noted above.

The present invention has been accomplished on the basis of those findings.

Specifically, the invention provides the following:

(1) A method for producing polycarbonates through melt transesterification, wherein is used a catalyst comprising (a) a phosphorus-containing basic compound and (b) a quaternary phosphonium salt having one or more groups selected from aryl groups and branched alkyl groups, provided that, when the phosphorus-containing basic compound (a) is a quaternary phosphonium salt, it differs from the quaternary phosphonium salt (b) (first aspect of the invention);

(2) A method for producing polycarbonates through transesterification, which comprises pre-polymerization to prepare polycarbonate prepolymers followed by final polymerization of said prepolymers in a solid phase or in a swollen solid phase to produce the products, polycarbonates, and which is characterized in that a catalyst comprising (a) a phosphorus-containing basic compound and (b) a quaternary phosphonium salt having one or more groups selected from aryl groups and branched alkyl groups, provided that, when the phosphorus-containing basic compound (a) is a quaternary phosphonium salt, it differs from the quaternary phosphonium salt (b), is used in the pre-polymerization and in the final polymerization (second aspect of the invention);

(3) A method for producing polycarbonates, which comprises preparing polycarbonate prepolymers in pre-polymerization followed by polymerizing said prepolymers in a solid phase or in a swollen solid phase in the presence of a catalyst of a tri-valent or penta-valent phosphorus compound or a nitrogen-containing organic basic compound (third aspect of the invention);

(4) A method for producing polycarbonates by polymerizing polycarbonate prepolymers in a solid phase or in a swollen solid phase, wherein said prepolymers are polymerized in a vapor-phase atmosphere having an oxygen concentration of not larger than 2 ppm (fourth aspect of the invention).

BEST MODES OF CARRYING OUT THE INVENTION

In the present invention, polycarbonates are produced through transesterification.

The starting materials for the transesterification are not specifically defined, and various materials for ordinary transesterification to give polycarbonates are employable herein.

For example, preferably used are (A) dihydroxy compounds and (B) dicarbonates, and optionally used are terminal-stopping agents, chain-branching agents, etc. In the third and fourth aspects of the invention, phosgene may be used as the component (B) for producing the prepolymers.

(1) Starting Materials

Dihydroxy Compounds for Component (A)

For example, aromatic dihydroxy compounds and aliphatic dihydroxy compounds are mentioned, and at least one selected from them is used in the invention.

As examples of the aromatic dihydroxy compounds usable as the component (A), mentioned are those of a general formula (I):

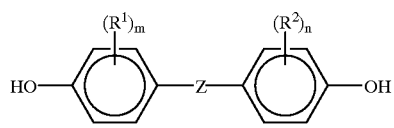

(I)

In formula (I), $R^1$ and $R^2$ each represent a halogen atom such as a fluorine, chlorine, bromine or iodine atom, or an alkyl group having from 1 to 20 carbon atoms such as a methyl, ethyl, n-propyl, isopropyl, n-butyl, isobutyl, sec-butyl, t-butyl, pentyl, hexyl, cyclohexyl, heptyl or octyl group. $R^1$ and $R^2$ may be the same or different ones. Plural $R^1$'s, if any, may be the same or different ones; and plural $R^2$'s, if any, may be the same or different ones. m and n each represent an integer of from 0 to 4. Z represents a single bond, an alkylene group having from 1 to 20 carbon atoms, an alkylidene group having from 2 to 20 carbon atoms, a cycloalkylene group having from 5 to 25 carbon atoms, a cycloalkylidene group having from 5 to 25 carbon atoms, or a bond of —S—, —SO—, —$SO_2$—, —O— or —CO—, or a bond of the following formula (II) or (II'):

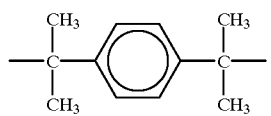

(II)

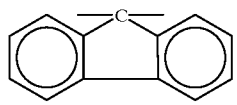

(II')

The alkylene group having from 1 to 20 carbon atoms and the alkylidene group having from 2 to 20 carbon atoms include, for example, methylene, ethylene, propylene, butylene, pentylene, hexylene, ethylidene and isopropylidene groups. The cycloalkylene group having from 5 to 25 carbon atoms and the cycloalkylidene group having from 5 to 25 carbon atoms include, for example, cyclopentylene, cyclohexylene, cyclopentylidene and cyclohexylidene groups.

In preferred embodiments of the invention, one or more of the compounds mentioned above are suitably selected and used as the dihydroxy compounds for the component (A). Of those compounds noted above, preferred is an aromatic dihydroxy compound of bisphenol A.

In addition, diesters of dihydroxy compounds, dicarbonates of dihydroxy compounds, monocarbonates of dihydroxy compounds are also usable in the invention.

Compounds for Component (B)

[1] Dicarbonates:

Various types of dicarbonates are usable in the invention. For example, used is at least one selected from diaryl carbonates, dialkyl carbonates and alkylaryl carbonates.

The diaryl carbonates usable for the component (B) include compounds of a general formula (III):

(III)

wherein $Ar^1$ and $Ar^2$ each represent an aryl group, and these may be the same or different ones;

and compounds of a general formula (IV):

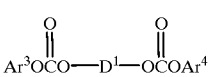

(IV)

wherein $Ar^3$ and $Ar^4$ each represent an aryl group, and these may be the same or different ones; and $D^1$ represents a residue of an aromatic dihydroxy compound of those noted above from which 2 hydroxyl groups are removed.

The dialkyl carbonates include compounds of a general formula (V):

(V)

wherein $R^3$ and $R^4$ each represent an alkyl group having from 1 to 20 carbon atoms or a cycloalkyl group having from 4 to 20 carbon atoms, and these may be the same or different ones;

and compounds of a general formula (VI):

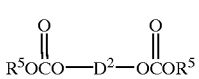

(VI)

wherein $R^5$ and $R^6$ each represent an alkyl group having from 1 to 20 carbon atoms or a cycloalkyl group having from 4 to 20 carbon atoms, and these may be the same or different ones; and $D^2$ represents a residue of an aromatic dihydroxy compound of those noted above from which 2 hydroxyl groups are removed.

The alkylaryl carbonates include compounds of a general formula (VII):

(VII)

wherein $Ar^5$ represents an aryl group; and $R^7$ represents an alkyl group having from 1 to 20 carbon atoms or a cycloalkyl group having from 4 to 20 carbon atoms;

and compounds of a general formula (VIII):

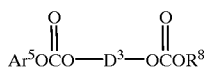

(VIII)

wherein $Ar^6$ represents an aryl group; $R^8$ represents an alkyl group having from 1 to 20 carbon atoms or a cycloalkyl group having from 4 to 20 carbon atoms; and $D^3$ represents a residue of an aromatic dihydroxy compound of those noted above from which 2 hydroxyl groups are removed.

One or more of the compounds mentioned above are suitably selected and used as the dicarbonates for the component (B). Of those compounds noted above, preferred is diphenyl carbonate.

(2) Catalysts

In the first and second aspects of the invention, used is a polymerization catalyst in transesterification, which comprises (a) a phosphorus-containing basic compound and (b) a quaternary phosphonium salt having one or more groups selected from aryl groups and branched alkyl groups, provided that, the quaternary phosphonium salt (b) differs from the phosphorus-containing basic compound (a). In the second aspect of the invention, the catalyst is used both in the pre-polymerization and in the final polymerization.

(a) Phosphorus-Containing Basic Compounds:

One or more phosphorus-containing basic compounds are usable either singly or as combined. However, when the phosphorus-containing basic compound (a) is a quaternary phosphonium salt, it shall differ from the quaternary phosphonium salt (b). The phosphorus-containing basic compounds include, for example, tri-valent phosphorus compounds and quaternary phosphonium salts such as those mentioned below. Preferred are alkyl-having phosphonium salts.

(i) Tri-valent Phosphorus Compounds:

Various tri-valent phosphorus compounds are usable herein with no specific limitation. For example, used are compounds of general formulae (IX) and (X):

 (IX)

 (X)

In formulae (IX) and (X), $R^9$ represents a hydrogen atom or an organic group. The organic group includes, for example, an alkyl or cycloalkyl group such as a methyl, ethyl, propyl, butyl, pentyl, hexyl, octyl or cyclohexyl group; an aryl group such as a phenyl, tolyl, naphthyl or biphenyl group; and an arylalkyl group such as a benzyl group. Three $R^9$'s may be the same or different ones, or two of them may be bonded to each other to form a cyclic structure.

Of those tri-valent phosphorus compounds, the compounds of formula (IX) include, for example, alkylphosphines such as ethylphosphine, diethylphosphine, propylphosphine, dipropylphosphine, diisoamylphosphine, triethylphosphine, tri-n-propylphosphine, triisopropylphosphine, tri-n-butylphosphine, etc.; and arylphosphines or arylalkylphosphines such as phenylphosphine, diphenylphosphine, phenylmethylphosphine, phenyldimethylphosphine, triphenylphosphine, tri-p-tolylphosphine, tri-o-tolylphosphine, tris(2,4-di-t-butylphenyl)phosphine, tris(p-methoxyphenyl)phosphine, etc.

The compounds of formula (X) include, for example, alkyl phosphites such as dimethyl phosphite, trimethyl phosphite, diethyl phosphite, triethyl phosphite, dibutyl phosphite, tributyl phosphite, dipropyl phosphite, tripropyl phosphite, dipentyl phosphite, tripentyl phosphite, dinonyl phosphite, trinonyl phosphite, didecyl phosphite, tridecyl phosphite, dioctadecyl phosphite, trioctadecyl phosphite, etc.; aryl phosphites such as diphenyl phosphite, triphenyl phosphite, tris(ethylphenyl)phosphite, tris(2,4-di-t-butylphenyl) phosphite, tris(nonylphenyl) phosphite, tris (hydroxyphenyl) phosphite, etc.; and arylalkyl phosphites such as diphenyloctyl phosphite, diphenyldecyl phosphite, phenyldidecyl phosphite, 4,4'-butylidene-bis(3-methyl-6-t-butylphenyl-ditridecyl)phosphite, 1,1,3-tris(2-methyl-4-ditridecyl phosphito-5-t-butylphenyl)butane, 4,4'-isopropylidene-diphenolalkyl phosphites, etc.

(ii) Quaternary Phosphonium Salts:

Various quaternary phosphonium salts are usable herein with no specific limitation. For example, preferably used are compounds of general formulae (XI) and (XII):

 (XI)

 (XII)

In formulae (XI) and (XII), $R^{10}$ represents an organic group. The organic group includes, for example, an alkyl or cycloalkyl group such as a methyl, ethyl, propyl, butyl, pentyl, hexyl, octyl or cyclohexyl group; an aryl group such as a phenyl, tolyl, naphthyl or biphenyl group; and an arylalkyl group such as a benzyl group. Four $R^{10}$'s may be the same or different ones, or two of them may be bonded to each other to form a cyclic structure. $X^1$ represents a group capable of forming a mono-valent anion, such as a halogen atom, a hydroxyl group, an alkyloxy group, an aryloxy group, R'COO, $HCO_3$, $(R'O)_2P(=O)O$, $BR''_4$ or the like. In those, R' represents a hydrocarbon group such as an alkyl group, an aryl group or the like, and two (R'O)s may be the same or different ones. R" represents a hydrogen atom, or a hydrocarbon group such as an alkyl group, an aryl group or the like, and four R"s may be the same or different ones. $Y^1$ represents a group capable of forming a di-valent anion, such as $CO_3$ or the like.

The quaternary phosphonium salts include, for example, tetra(aryl or alkyl)phosphonium hydroxides such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetramethylphosphonium hydroxide, tetraethylphosphonium hydroxide, tetrabutylphosphonium hydroxide, etc.; as well as tetramethylphosphonium tetraphenyl borate, tetraethylphosphonium tetraphenyl borate, tetrabutylphosphonium tetraphenyl borate, tetraphenylphosphonium bromide, tetraphenylphosphonium phenolate, tetraphenylphosphonium tetraphenyl borate, methyltriphenylphosphonium tetraphenyl borate, cyclohexyltriphenylphosphonium tetraphenyl borate, benzyltriphenylphosphonium tetraphenyl borate, biphenyltriphenylphosphonium tetraphenyl borate, tetratolylphosphonium tetraphenyl borate, tetraphenylphosphonium phenolate, tetra(p-t-butylphenyl)phosphonium diphenyl phosphate, triphenylbutylphosphonium phenolate, triphenylbutylphosphonium tetraphenyl borate, etc.

Except the compounds of formula (XI) noted above, also usable herein are bis-tetraphenylphosphonium salt of 2,2-bis(4-hydroxyphenyl)propane, and ethylenebis (triphenylphosphonium)dibromide, trimethylenebis (triphenylphosphonium)-bis(tetraphenyl borate), etc.

Of the quaternary phosphonium salts noted above, preferred are those in which the carbon atoms directly bonding to the phosphorus atom of the phosphonium moiety do not have a branched structure, especially those having alkyl groups of that structure, since they have high catalytic activity and since they are easily pyrolyzed and hardly remain in the polymers produced. For example, preferably used are tetrabutylphosphonium tetraphenyl borate, tetraethylphosphonium tetraphenyl borate, tetrabutylphosphonium hydroxide, etc.

(b) Quaternary Phosphonium Salts having aryl and/or branched alkyl groups:

Herein usable are compounds of general formulae (XIII) and (XIV):

  (XIII)

  (XIV)

In the first and second aspects of the invention, however, the quaternary phosphonium salt (b) must differ from the phosphorus-containing basic compound (a).

In formulae (XIII) and (XIV);

n represents an integer of from 1 to 4.

$R^{11}$ represents at least one selected from an aryl group and a branched alkyl group. The branched alkyl group has a structure of "$R_3C-$", in which R represents at least one selected from a hydrogen atom, an alkyl group, a substituted alkyl group, an aryl group, and a substituted aryl group, and at least two of the three R's may be bonded to each other to form a cyclic structure. In this, however, two R's must not be hydrogens at the same time. For example, $R^{11}$ is a cycloalkyl group, a branched alkyl group such as an isopropyl or tert-butyl group, or an aryl group such as a phenyl group.

When n is 2 or more, plural R's may be the same or different ones.

$R^{12}$ represents an alkyl group, a substituted alkyl group, an aryl group, or a substituted aryl group.

$X^2$ represents a group capable of forming a mono-valent anion, such as a halogen atom, a hydroxyl group, an alkyloxy group, an aryloxy group, R'COO, $HCO_3$, $(R'O)_2P(=O)O$, $BR''_4$ or the like. In those, R' represents a hydrocarbon group such as an alkyl group, an aryl group or the like, and two (R'O)s may be the same or different ones. R" represents a hydrogen atom, or a hydrocarbon group such as an alkyl group, an aryl group or the like, and four R"s may be the same or different ones.

$Y^1$ represents a group capable of forming a di-valent anion, such as $CO_3$ or the like.

The quaternary phosphonium salts include, for example, the following:

Tetra(aryl or alkyl)phosphonium hydroxides, such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetracyclohexylphosphonium hydroxide, etc.;

Mono(aryl or alkyl)triphenylphosphonium hydroxides, such as methyltriphenylphosphonium hydroxide, ethyltriphenylphosphonium hydroxide, propyltriphenylphosphonium hydroxide, butyltriphenylphosphonium hydroxide, octyltriphenylphosphonium hydroxide, tetradecyltriphenylphosphonium hydroxide, benzyltriphenylphosphonium hydroxide, ethoxybenzyltriphenylphosphonium hydroxide, methoxymethyltriphenylphosphonium hydroxide, acetoxymethyltriphenylphosphonium hydroxide, phenacyltriphenylphosphonium hydroxide, chloromethyltriphenylphosphonium hydroxide, bromomethyltriphenylphosphonium hydroxide, biphenyltriphenylphosphonium hydroxide, naphtyltriphenylphosphonium hydroxide, chlorophenyltriphenylphosphonium hydroxide, phenoxyphenyltriphenylphosphonium hydroxide, methoxyphenyltriphenylphosphonium hydroxide, acetoxyphenyltriphenylphosphonium hydroxide, naphtylphenyltriphenylphosphonium hydroxide, etc.;

Mono(aryl)trialkylphosphonium hydroxides, such as phenyltrimethylphosphonium hydroxide, biphenyltrimethylphosphonium hydroxide, phenyltrihexylphosphonium hydroxide, biphenyltrihexylphosphonium hydroxide, etc.

Diaryldialkylphosphonium hydroxides, such as dimethyldiphenylphosphonium hydroxide, diethyldiphenylphosphonium hydroxide, di(biphenyl)diphenylphosphonium hydroxide, etc.;

Tetraarylphosphonium tetraphenyl borates, such as tetraphenylphosphonium tetraphenyl borate, tetranaphthylphosphonium tetraphenyl borate, tetra(chlorophenyl)phosphonium tetraphenyl borate, tetra(biphenyl)phosphonium tetraphenyl borate, tetratolylphosphonium tetraphenyl borate, etc.;

Mono(aryl or alkyl)triphenylphosphonium tetraphenyl borates, such as methyltriphenylphosphonium tetraphenyl borate, ethyltriphenylphosphonium tetraphenyl borate, propyltriphenylphosphonium tetraphenyl borate, butyltriphenylphosphonium tetraphenyl borate, octyltriphenylphosphonium tetraphenyl borate, tetradecyltriphenylphosphonium tetraphenyl borate, cyclohexyltriphenylphosphonium tetraphenyl borate, cyclopentyltriphenylphosphonium tetraphenyl borate, benzyltriphenylphosphonium tetraphenyl borate, ethoxybenzyltriphenylphosphonium tetraphenyl borate, methoxymethyltriphenylphosphonium tetraphenyl borate, acetoxymethyltriphenylphosphonium tetraphenyl borate, phenacyltriphenylphosphonium tetraphenyl borate, chloromethyltriphenylphosphonium tetraphenyl borate, bromomethyltriphenylphosphonium tetraphenyl borate, biphenyltriphenylphosphonium tetraphenyl borate, naphtyltriphenylphosphonium tetraphenyl borate, chlorophenyltriphenylphosphonium tetraphenyl borate, phenoxyphenyltriphenylphosphonium tetraphenyl borate, acetoxyphenyltriphenylphosphonium tetraphenyl borate, naphthylphenyltriphenylphosphonium tetraphenyl borate, etc.;

Monoaryltrialkylphosphonium tetraphenyl borates, such as phenyltrimethylphosphonium tetraphenyl borate, biphenyltrimethylphosphonium tetraphenyl borate, phenyltrihexylphosphonium tetraphenyl borate, biphenyltrihexylphosphonium tetraphenyl borate, etc.;

Diaryldialkylphosphonium tetraphenyl borates, such as dimethyldiphenylphosphonium tetraphenyl borate, diethyldiphenylphosphonium tetraphenyl borate, di(biphenyl)diphenylphosphonium tetraphenyl borate, etc.

Further mentioned are derivatives of the quaternary phosphonium salts mentioned above, in which the counter anion of hydroxide or tetraphenyl borate is replaced with any of aryloxides such as phenoxide, alkoxides such as methoxide or ethoxide, alkylcarbonyloxides such as acetate, arylcarbonyloxides such as benzoate, or halides such as chloride or bromide.

Apart from the compounds of formula (XIII) noted above, also employable herein are compounds of formula (XIV) having a di-valent counter anion. As those, for example, mentioned are quaternary phosphonium salts such as bis(tetraphenylphosphonium) carbonate, bis(biphenyltriphenylphosphonium) carbonate, as well as bis-tetraphenylphosphonium salt of 2,2-bis(4-hydroxyphenyl)propane, and ethylenebis(triphenylphosphonium) dibromide, trimethylenebis(triphenyliphosphonium)-bis(tetraphenyl borate).

In addition, further employable herein are compounds of general formulae (XV) and (XVI):

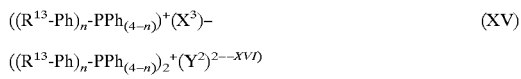

$$((R^{13}\text{-Ph})_n\text{-PPh}_{(4-n)})^+(X^3)^- \quad (XV)$$

$$((R^{13}\text{-Ph})_n\text{-PPh}_{(4-n)})_2^+(Y^2)^{2-} \quad (XVI)$$

wherein $R^{13}$ represents an organic group, and plural $R^{13}$'s, if any, may be the same or different ones; $X^3$ represents a halogen atom, a hydroxyl group, an alkyloxy croup, an aryloxy group, an alkylcarbonyloxy group, an arylcarbonyloxy group, $HCO_3$, or $BR_4$ (in which R represents a hydrogen atom or a hydrocarbon group, and four R's may be the same or different ones); Ph represents a phenyl group; $Y^2$ represents $CO_3$; and n represents an integer of from 1 to 4.

Specific examples of those quaternary phosphonium compounds include, for example, biphenyltriphenylphosphonium hydroxide, methoxyphenyltriphenylphosphonium hydroxide, phenoxyphenyltriphenylphosphonium hydroxide, naphthylphenyltriphenylphosphonium hydroxide, tetraphenylphosphonium tetraphenyl borate, biphenyltriphenylphosphonium tetraphenyl borate, methoxyphenyltriphenylphosphonium tetraphenyl borate, phenoxyphenyltriphenylphosphonium tetraphenyl borate, naphthylphenyltriphenylphosphonium tetraphenyl borate, tetraphenylphosphonium phenoxide, biphenyltriphenylphosphonium phenoxide, methoxyphenyltriphenylphosphonium phenoxide, phenoxyphenyltriphenylphosphonium phenoxide, naphthylphenyltriphenylphosphonium phenoxide, tetraphenylphosphonium chloride, biphenyltriphenylphosphonium chloride, methoxyphenyltriphenylphosphonium chloride, phenoxyphenyltriphenylphosphonium chloride, naphthylphenyltriphenylphosphonium chloride, etc.

Specific examples of branched alkyl-having quaternary phosphoniums include isopropyltrimethylphopshonium, isopropyltriethylphosphonium, isopropyltributylphosphonium, isopropyltriphenylphosphonium, tetraisopropylphosphonium, cyclohexyltriethylphosphonium, cyclohexyltrimethylphosphonium, cyclohexyltributylphosphonium, cyclohexyltriphenylphosphonium, tetracyclohexylphosphonium, 1,1,1-triphenylmethyltrimethylphosphonium, 1,1,1-triphenylmethyltriethylphosphonium, 1,1,1-triphenylmethyltributylphosphonium, 1,1,1-triphenylmethyltriphenylphosphonium, etc.

Specific examples of counter anions for $X^3$ include hydroxide, borohydride, tetraphenyl borate, acetate, propionate, fluoride, chloride, hydrocarbonate, etc.

One example of $Y^2$ is carbonate.

As specific examples of salts composed of a branched alkyl-having quaternary phosphonium (cation) and X or Y (anion), mentioned are various combinations of the specific examples for cations and anions noted above. For those, specifically mentioned are isopropyltrimethylphosphonium hydroxide, cyclohexyltriphenylphosphonium chloride, 1,1,1-triphenylmethyltriethylphosphonium acetate, bis(isopropyltriethylphosphonium) carbonate, etc.

Of those branched alkyl-having quaternary phosphonium salts, especially preferred are cyclohexyltriphenylphosphonium tetraphenyl borate and cyclopentyltriphenylphosphonium tetraphenyl borate, since their catalytic activity and the quality of polycarbonates to be produced are well balanced.

It is desirable that the amount of metallic impurities in the phosphorus-containing basic compounds and the quaternary phosphonium salts for use in the present invention is as small as possible. Especially preferably, the amount of alkali metal and alkaline earth metal compounds in those compounds is not larger than 50 ppm.

In the first and second aspects of the invention, it is desirable that the polymerization catalyst to be used comprises the phosphorus-containing basic compound of the component (a) in an amount of from $10^{-8}$ to $10^{-1}$ mols, preferably from $10^{-7}$ to $10^{-2}$ mols, more preferably from $10^{-6}$ to $10^{-3}$ mols, relative to one mol of the starting dihydroxy compound of the component (A), and the quaternary phosphonium salt of the component (b) in an amount of from $10^{-8}$ to $10^{-2}$ mols, preferably from $10^{-7}$ to $10^{-3}$ mols, more preferably from $10^{-7}$ to $10^{-4}$ mols relative to the same. If the amount of the component (a) is smaller than $10^{-8}$ mols, the catalyst activity is unfavorably low in the initial stage of the reaction. However, if larger than $10^{-1}$ mols, the cost of the catalyst unfavorably increases. On the other hand, if the amount of the component (b) is smaller than $10^{-8}$ mols, the catalyst activity is unfavorably low in the latter stage of the reaction. However, if larger than $10^{-2}$ mols, the cost of the catalyst unfavorably increases.

The amount of the polymerization catalyst to be added to the reaction system is such that the total amount of the components (a) and (b) constituting it is generally from $10^{-8}$ to $10^{-1}$ mols, preferably from $10^{-7}$ to $10^{-2}$ mols, more preferably from $10^{-6}$ to $10^{-3}$ mols, relative to one mol of the starting dihydroxy compound of the component (A). If its amount added is smaller than $10^{-8}$ mols, the catalyst could not exhibit its catalytic activity. However, if too much catalyst of larger than $10^{-1}$ mols is added, the physical properties of the final products, polycarbonates will be worsened. In particular, if so, the heat resistance and the hydrolysis resistance of the products will be lowered. In addition, the production costs will increase. For these reasons, addition of too much catalyst over the range noted above is unnecessary.

The catalyst to be used in the third aspect of the invention is described hereinunder. In this aspect of the invention, it is desirable that the catalyst to be used in the pre-polymerization step is the same as the nitrogen-containing organic basic compound which is used as the catalyst in the final polymerization step. The nitrogen-containing organic basic compound will be described in detail hereinunder. In the pre-polymerization step, it is desirable that the catalyst of a nitrogen-containing organic basic compound is used in an amount of from $10^{-8}$ to $10^{-2}$ mols, more preferably from $10^{-7}$ to $10^{-3}$ mols, relative to one mol of the starting dihydroxy compound of the component (A). If the amount of the nitrogen-containing organic basic compound used is smaller than $10^{-8}$ mols, the catalytic activity in the initial stage of the reaction will be low. However, if larger than $10^{-2}$ mols, the cost of the catalyst unfavorably increases.

In the third aspect of the invention, polycarbonate prepolymers are first prepared, and these are polymerized in a solid phase or in a swollen solid phase in the presence of a polymerization catalyst of a tri-valent or penta-valent phosphorus compound or a nitrogen-containing organic basic compound.

The tri-valent phosphorus compound to be used is not specifically defined. For example, employable are compounds of formulae (IX) and (X) mentioned hereinabove. As specific examples of such tri-valent phosphorus compounds, referred to are those concretely mentioned hereinabove.

The penta-valent phosphorus compound for use in the invention is not also specifically defined. For example, employable are compounds of the following general formulae (XVII) and (XVIII):

$$R^{14}{}_3P{=}O \quad (XVII)$$

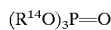

$$(R^{14}O)_3P{=}O \quad (XVIII)$$

In formulae (XVII) and (XVIII), $R^{14}$ represents a hydrogen atom or an organic group. The organic group includes, for example, an alkyl or cycloalkyl group such as a methyl, ethyl, propyl, butyl, pentyl, hexyl, octyl or cyclohexyl group, an aryl group such as a phenyl, tolyl, naphthyl group, or an arylalkyl group such as a benzyl group. Three $R^{14}$'s may be the same or different ones, and two of $R^{14}$'s may be bonded to each other to form a cyclic structure.

Of such penta-valent phosphorus compounds, those of formula (XVII) include triphosphates such as triethyl phosphate, tri-n-propyl phosphate, triisopropyl phosphate, tri-n-butyl phosphate, triphenyl phosphate, tri-p-tolyl phosphate, tri-o-tolyl phosphate, etc.; and those of formula (XVIII) include phosphine oxide as triethylphosphine oxide, tri-n-propylphosphine oxide, triisopropylphosphine oxide, tri-n-butylphosphine oxide, triphenylphosphine oxide, tri-p-tolylphosphine oxide, tri-o-tolylphosphine oxide, etc. Further mentioned are phosphates (alkyl or aryl acid phosphates) such as methyl acid phosphate, ethyl acid phosphate, isopropyl acid phosphate, butyl acid phosphate, 2-ethylhexyl acid phosphate, isodecyl acid phosphate, lauryl acid phosphate, tridecyl acid phosphate, stearyl acid phosphate, oleyl acid phosphate, phenyl acid phosphate, tolyl acid phosphate, t-butylphenyl acid phosphate, naphthyl acid phosphate, etc. Those phosphates (alkyl or aryl acid phosphates) may be monoesters, diesters, or even their mixtures.

Various types of nitrogen-containing organic basic compounds are employable herein with no specific limitation. For example, employable are aliphatic tertiary amine compounds such as trimethylamine, triethylamine, tripropylamine, tributylamine, tripentylamine, trihexylamine, dimethylbenzylamine, etc.; aromatic tertiary amine compounds such as triphenylamine, etc.; and other nitrogen-containing organic basic compounds such as N,N-dimethyl-4-aminopyridine, 4-diethylaminopyridine, 4-pyrrolidinopyridine, 4-aminopyridine, 2-aminopyridine, 2-hydroxypyridine, 4-hydroxypyridine, 2-methoxypyridine, 4-methoxypyridine, imidazole, 2-methylimidazole, 4-methylimidazole, 2-dimethylimidazole, 2-methoxyimidazole, 2-mercaptoimidazole, aminoquinoline, diazabicyclooctane (DABCO), etc.

Further employable are quaternary ammonium salts of a general formula (XIX):

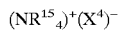

$$(NR^{15}{}_4)^+(X^4)^- \quad (XIX)$$

In formula (XIX), $R^{15}$ represents an organic group, for example, an alkyl or cycloalkyl group such as a methyl, ethyl, propyl, butyl, pentyl, hexyl, octyl or cyclohexyl group, an aryl group such as a phenyl, tolyl or biphenyl group, or an arylalkyl group such as a benzyl group. Four $R^{15}$'s may be the same or different ones; and two of them may be bonded to each other to form a cyclic structure. $X^4$ represents a halogen atom, a hydroxyl group, or $BR_4$, in which R represents a hydrogen atom, or a hydrocarbon group such as an alkyl or aryl group, and four R's may be the same or different ones.

Examples of the quaternary ammonium salts include ammonium hydroxides having alkyl, aryl and/or alkaryl groups, such as tetramethylammonium hydroxide, tetraethylammonium hydroxide, tetrabutylammonium hydroxide, trimethylbenzylammonium hydroxide, etc.; and basic salts such as tetramethylammonium borohydride, tetrabutylammonium borohydride, tetrabutylammonium tetraphenyl borate, tetramethylammonium tetraphenyl borate, etc.

Of the nitrogen-containing organic basic compounds noted above, preferred are the quaternary ammonium salts of formula (XIX), concretely such as tetramethylammonium hydroxide, tetrabutylammonium hydroxide, tetramethylaminonium borohydride, and tetrabutylammonium borohydride, since they have high catalytic activity and since they are easily pyrolyzed and hardly remain in the polymers produced. Of those, especially preferred is tetramethylammonium hydroxide.

One or more of those nitrogen-containing organic basic compounds are employable herein either singly or as combined.

It is desirable that the amount of metallic impurities in the nitrogen-containing organic basic compounds for use in the present invention is as small as possible. Especially preferably, the amount of alkali metal and alkaline earth metal compounds in those compounds is not larger than 50 ppm.

The catalyst to be used in the fourth aspect of the invention is described hereinunder. In this aspect of the invention, it is desirable to use a nitrogen-containing organic basic compound as the catalyst in the pre-polymerization step. The nitrogen-containing organic basic compound to be used is not specifically defined, any may include, for example, aliphatic tertiary amine compounds, aromatic tertiary amine compounds and nitrogen-containing heterocyclic compounds.

Also usable are the quaternary ammonium salts of formula (XIX) mentioned hereinabove. As specific examples and preferred examples of the quaternary ammonium salts to be used in the fourth aspect of the invention, referred to are those previously mentioned hereinabove.

One or more of those nitrogen-containing organic basic compounds are employable herein either singly or as combined.

The amount of the nitrogen-containing organic basic compound to be used in the pre-polymerization step and also the preferred range of the amount are the same as those in the third aspect of the invention mentioned hereinabove.

In the fourth aspect of the invention, polycarbonate prepolymers are first prepared, and they are polymerized in a solid phase or in a swollen solid phase preferably in the presence of a polymerization catalyst of a quaternary ammonium salt. In the final polymerization step, the catalyst to be used may be the same as the catalyst of a nitrogen-containing organic basic compound used in the pre-polymerization step, or may also be a tri-valent or penta-valent phosphorus compound.

Various quaternary phosphonium salts are usable herein with no specific limitation. For example, preferably used are the compounds of formula (XI) noted above. For specific examples of the compounds of formula (XI), referred to are those previously mentioned hereinabove.

In addition to the compounds of formula (XI), also usable are, for example, bis-tetraphenylphosphonium salt of 2,2- bis(4-hydroxyphenyl)propane, and ethylenebis (triphenylphosphonium) dibromide, trimethylenebis (triphenylphosphonium)-bis(tetraphenyl borate), etc.

Of those quaternary phosphonium salts, preferred are tetraphenylphosphonium tetraphenyl borate, biphenyltriphenylphosphonium tetraphenyl borate, and cyclohexyltriphenylphosphonium tetraphenyl borate, since they have high catalytic activity and since they are easily pyrolyzed and hardly remain in the polymers produced.

One or more of the quaternary phosphonium salts may be used either singly or as combined.

It is desirable that the amount of the quaternary phosphonium salt to be used is from $10^{-8}$ to $10^{-2}$ mols relative to one mol of the starting dihydroxy compound of the component (A). If the amount of the quaternary phosphonium salt used is smaller than $10^{-8}$ mols, the catalytic activity will be poor in the latter stage of the reaction. However, if larger than $10^{-2}$ mols, the cost of the catalyst unfavorably increases.

(3) Preparation of Prepolymers in Pre-polymerization

In the second to fourth aspects of the invention, polycarbonate prepolymers are first prepared in pre-polymerization, and they are finally polymerized in a solid phase or in a swollen solid phase into polycarbonates. In this process, the catalyst used in the pre-polymerization and still remaining in the reaction system may be directly used in the final polymerization, or the same catalyst as that used in the pre-polymerization may be again added to the final polymerization system, so far as the catalyst falls within the scope specifically defined hereinabove. If desired, different catalysts may be used in the pre-polymerization and in the final polymerization. The method of adding the catalyst to the reaction system in the second aspect of the invention will be described hereinunder.

In the second to fourth aspects of the invention, the starting materials of a dihydroxy compound of the component (A), and a dicarbonate or phosgene of the component (B), and optionally a terminal-stopping agent, a chain-branching agent and the like are subjected to pre-polymerization in the presence of the catalyst noted above to prepare prepolymers. Preferred methods and conditions for the pre-polymerization are concretely mentioned below.

[1] Method of Pre-polymerization:

A dihydroxydiaryl compound and a diaryl carbonate are reacted under heat, while the aromatic monohydroxy compound formed is removed, to prepare a prepolymer. The weight-average molecular weight of the prepolymer produced in this pre-polymerization step preferably falls between 2000 and 20000. In the pre-polymerization, optionally used is a solvent that is inert to the reaction, such as methylene chloride, chloroform or the like. In general, however, the pre-polymerization is effected in the absence of a solvent or while the monomers are in a molten state.

The ratio of the diaryl carbonate to the dihydroxydiaryl compound to be reacted (that is, the amounts of the compounds to be fed into a reactor) may vary, depending on the type of the compounds and also on the reaction conditions including the reaction time and the reaction temperature, but may be generally such that the amount of the diaryl carbonate falls between 0.9 and 2.5 mols, preferably between 0.95 and 2.0 mols, more preferably between 0.98 and 1.5 mols, relative to one mol of the dihydroxydiaryl compound.

The reaction temperature and the reaction time vary, depending on the type and the amount of the starting compounds and the catalyst used, the intended degree of polymerization of the prepolymer to be produced, and other reaction conditions, but may preferably fall between 50 and 350° C., and between 1 minute and 100 hours, respectively. In order not to unfavorably color the prepolymer produced, it is desirable that the pre-polymerization is effected at as low as possible temperatures and within a short period of time. In this process, prepolymers having a relatively low molecular weight may be produced in the pre-polymerization step. Therefore, under the conditions noted above, colorless and transparent prepolymers having a desired degree of polymerization could be produced herein. The pressure in the pre-polymerization preferably falls between 1 Torr and 5 $kg/cm^2G$.

The ratio of the terminals in the prepolymer to be produced in the pre-polymerization step is preferably such that the ratio of phenylcarbonate terminal to hydroxyl terminal falls between 1/4 and 4/1, more preferably between 1/1.5 and 1.5/1, even more preferably between 1/1.1 and 1.1/1. If the terminal ratio falls outside the defined range, the molecular weight of the final polymers to be obtained will be unfavorably limited, and it will be difficult to obtain high-molecular polymers.

In the third and fourth aspects of the invention, an aromatic dihydroxy compound and phosgene are reacted in any known manner, in the presence of a molecular weight-controlling agent, an acid binder and a solvent, to prepare prepolymers.

In order to obtain preferable spherical polycarbonate prepolymers, the powdery prepolymer having been prepared in the pre-polymerization step is put into a granulator, to which is added an organic solvent solution of the prepolymer, and the solution is contacted with the powdery prepolymer in the granulator while the solvent is evaporated, whereby the powdery prepolymer may be granulated into a spherical one. The powdery prepolymer to be processed in that manner may be prepared according to the pre-polymerization method mentioned above.

In this process, it is desirable that the concentration of the prepolymer to be in the organic solvent solution falls between 1 and 50% by weight.

To form the spherical prepolymer in the process that uses the organic solvent solution of the prepolymer, the powdery prepolymer is first fed into a granulator, and kept stirred therein. Then, an organic solvent solution of the prepolymer is fed into the granulator. The thus-fed solvent solution is contacted with the powdery prepolymer that is kept stirred in the granulator, while the organic solvent is evaporated around the powdery prepolymer. Having been further stirred in that condition, the powdery prepolymer is granulated into a spherical one which is crystallized and has a nearly true spherical morphology.

The spherical prepolymer having been granulated in the granulator is taken out of the granulator in any desired manner, and used in the next solid-phase or swollen solid-phase polymerization to produce a polycarbonate.

In the granulation step, the powdery prepolymer which is previously put in the granulator and is kept stirred therein may be prepared in any known method. For example, usable are powdery prepolymers having been condensed and ground, for example, in a kneader or the like. The grain size of the powdery prepolymer to be previously put in the granulator is not specifically defined, but the powdery prepolymer is preferably so dressed that its grain size could fall between 0.5 and 3 mm or so. The amount of the powdery prepolymer to be put in the granulator is not specifically defined. The amount of the organic solvent solution of the prepolymer to be fed into the granulator is to be not larger than 500% by weight/hr, relative to the degree of solvent retentiveness of the powdery prepolymer having been previously kept stirred in the granulator to be in a uniform state. The means of feeding the organic solvent solution to the granulator is not specifically defined.

When the organic solvent solution of the prepolymer is fed into the granulator, it is desirable to feed thereinto a nucleating agent along with the solution. The nucleating solution may be a non-solvent or bad solvent for polycarbonates, and this enhances the granulation. For example, the nucleating agent includes linear or cyclic alkanes such as pentane, hexane, heptane, octane, etc.; ketones such as acetone, methyl ethyl ketone, etc.; and aromatic compounds such as benzene, toluene, xylene, etc.

Where the nucleating agent is used, the ratio of the nucleating agent to the organic solvent solution of prepolymer, which is represented by (nucleating agent)/(organic solvent solution of prepolymer)×100%, preferably falls between 5 and 50% by weight relative to the solid prepolymer content of the organic solvent solution.

The retention time for the spherical prepolymer in the granulator may generally fall between 0.2 and 6 hours or so, though varying depending on the amount of the organic solvent solution of prepolymer fed into the granulator. It is desirable that the granulation temperature is so controlled that the organic solvent of the solvent solution of prepolymer having been fed into the granulator could easily evaporate therein at the temperature. In general, the granulation temperature is kept to fall between 35 and 200° C. The pressure in the granulator is preferably kept to fall between 200 Torr and 10 kg/cm².

[2] Crystallization of Prepolymers:

Where prepolymers are used in the method of producing polycarbonates in the present invention, the prepolymers are preferably crystallized. The crystallization is not specifically defined. For example, preferably employed is solvent treatment or thermal crystallization. In the former solvent treatment, used is any of aliphatic halogenohydrocarbons such as chloromethane, methylene chloride, chloroform, etc.; aromatic halogenohydrocarbons such as chlorobenzene, etc.; ethers such as tetrahydrofuran, etc.; ester compounds such as methyl acetate, etc.; ketones such as acetone, etc.; and aromatic hydrocarbons such as benzene, etc. The amount of the solvent to be used varies, depending on the conditions for the treatment, but may preferably fall between 0.05 and 100 times by weight the prepolymer to be processed.

On the other hand, the thermal crystallization is to heat a prepolymer at a temperature not lower than the glass transition point of the intended aromatic polycarbonate but lower than the temperature at which the prepolymer begins to melt, whereby the prepolymer is crystallized. The temperature Tc (° C.) for the thermal crystallization is not specifically defined, provided that it is not lower than the glass transition point of the intended polycarbonate but lower than the melting point Tm (° C.) of the prepolymer.

(4) Production of Polycarbonates Through Polymerization

[1] Production in Melt State:

In the first aspect of the invention, polycarbonates are produced in melt transesterification.

Specifically, a dihydroxy compound of the component (A) and a dicarbonate of the component (B) are subjected to transesterification in a molar ratio of the dicarbonate to the dihydroxy compound falling between 0.9 and 1.5. As the case may be, the molar ratio preferably falls between 0.98 and 1.20.

In the transesterification, optionally used is a terminal-stopping agent that comprises a monophenol or the like.

When the terminal-stopping agent is added to the reaction system in an amount of from 0.05 to 10 mol % relative to the dihydroxy compound of the component (A), the hydroxyl terminals of the polycarbonate obtained can be blocked so that the heat resistance and the waterproofness of the polycarbonate are much improved.

All the necessary amount of the terminal-stopping agent that comprises a monophenol or the like may be previously added to the reaction system. Different from this, a part of the agent may be previously added to the reaction system, and the remaining part may be added thereto after the start of the reaction. As the case may be, after the transesterification between the dihydroxy compound of the component (A) and the dicarbonate of the component (B) has begun, all the necessary amount of the agent may be added to the reaction system.

The temperature for the transesterification is not specifically defined, and generally falls between 100 and 330° C., preferably between 150 and 300° C. More preferably, the temperature is gradually elevated with the advance of the reaction to fall between 150 and 300° C. If the temperature is lower than 100° C., the transesterification rate is too low. However, if higher than 330° C., some problems occur. For example, at such high temperatures, unfavorable side reaction will occur, or the polycarbonates produced will be unfavorably colored. The reaction pressure may be determined, depending on the vapor pressure of the monomers used and also on the reaction temperature. However, the reaction pressure is not specifically defined, provided that it is so determined that the reaction occurs smoothly under the pressure. In most cases, in general, the reaction system is under atmospheric pressure (normal pressure) or increased pressure falling between 1 and 50 atms (760 and 38,000 Torr) in the initial stage of the reaction, and is then under reduced pressure in the latter stage of the reaction. Preferably, the reaction system may be under a reduced pressure falling between 0.01 and 100 Torr in the final stage of the reaction.

The reaction may be continued until the products, polycarbonates could have the intended molecular weight, and the reaction time generally falls between 0.2 and 10 hours or so.

The transesterification is effected in a molten state generally in the absence of an inert solvent, but if desired, it may be effected in the presence of an inert solvent of from 1 to 150% by weight of the polycarbonate to be produced. The inert solvent includes, for example, aromatic compounds such as diphenyl ether, halogenated diphenyl ethers, benzophenone, polyphenyl ether, dichlorobenzene, methylnaphthalene, etc.; and cycloalkanes such as tricyclo (5,2,10)decane, cyclooctane, cyclodecane, etc. Also if desired, the transesterification may be effected in an inert gas atmosphere. Various types of inert gases can be employed for this, including, for example, gases such as argon, carbon dioxide, dinitrogen monoxide, nitrogen, etc.; chlorofluorohydrocarbons; alkanes such as ethane, propane, etc.; alkenes such as ethylene, propylene, etc.

Further if desired, an antioxidant may be added to the reaction system.

With the advance of the reaction, phenols, alcohols or their esters corresponding to the dicarbonates used, as well as the inert solvent used are released from the reactor, and the thus-released substances may be separated, purified and recycled. It is desirable that the reactor is equipped with a device for removing them.

The reaction may be effected either batchwise or continuously, for which any desired apparatus can be used.

For continuous production, desirably, at least 2 or more reactors are used and they are so controlled as to satisfy the reaction conditions noted above. The material and the structure of the reactors to be used are not specifically defined. Generally, however, the reactors shall have an ordinary stirring function. Since the viscosity of the reaction mixture increases in the latter stage of the reaction, it is desirable that the reactors have a high-performance stirring function applicable to high-viscosity mixtures. Regarding their shape, the reactors are not limited to only tank-type ones but may also be extruder-type ones.

After the transesterification, it is desirable that the reaction product is heated at a temperature not lower than the decomposition point of the catalyst used, preferably at about 300° C. or so, to thereby pyrolyze and remove the catalyst. This is to improve the quality of the product, polycarbonate (for example, to prevent the polycarbonate from being unfavorably colored).

The polycarbonate thus produced in the manner mentioned above may be directly granulated, or may be shaped into articles through extruders or the like.

[2] Production in Solid-Phase State or Swollen Solid-Phase State:

In the second to fourth aspects of the invention, a polycarbonate prepolymer is first prepared and this is finally polymerized in a solid-phase state or in a swollen solid-phase state.

In the final polymerization step in the second aspect, used is a catalyst comprising (a) a phosphorus-containing basic compound and (b) a quaternary phosphonium salt having one or more groups selected from aryl groups and branched alkyl groups, provided that, when the phosphorus-containing basic compound (a) is a quaternary phosphonium salt, it differs from the quaternary phosphonium salt (b). In this where a phosphorus-containing basic compound of the component (a) only is used as the catalyst in the pre-polymerization step, a quaternary phosphonium salt having one or more groups selected from aryl groups and branched alkyl groups of the component (b) may be used in the final polymerization step, provided that, when the phosphorus-containing basic compound (a) is a quaternary phosphonium salt, it shall differ from the quaternary phosphonium salt (b).

In the third aspect of the invention, used is a catalyst of a tri-valent or penta-valent phosphorus compound or a nitrogen-containing organic basic compound as the catalyst in the final polymerization step.

In the fourth aspect, preferably used is a quaternary phosphonium salt as the catalyst in the final polymerization step, in which, however, the nitrogen-containing organic basic compound used in the pre-polymerization step may also be used. If desired, in this, a tri-valent or penta-valent phosphorus compound may also be used as the catalyst.

(i) Polymerization in Solid-Phase State:

The solid prepolymer prepared previously, which is preferably crystallized, is finally polymerized. In this case, the side products, aromatic monohydroxy compound and/or diaryl carbonate are removed from the reaction system, whereby the reaction is accelerated. For this, for example, preferably employed is a method of introducing an inert gas such as nitrogen, argon, helium, carbon dioxide or the like, or a lower hydrocarbon gas into the reaction system to thereby remove the side products together with the gas, a method of effecting the reaction under reduced pressure, or a combination of the two. In the method of introducing the gas for accompanying the side products, it is desirable that the gas is pre-heated at a temperature near to the reaction temperature.

The shape of the crystalline prepolymer to be subjected to the solid-phase polymerization is not specifically defined, but the prepolymer is preferably in the form of pellets, beads or the like.

The reaction temperature Tp (° C.) and the reaction time for the polymerization may vary, depending on various conditions. Preferably, however, the crystalline prepolymer may be heated at a temperature which is not lower than the glass transition point of the intended aromatic polycarbonate and at which the prepolymer being in solid-phase polymerization is not melted but still keeps its solid-phase state, for a period of time falling between 1 minute and 100 hours.

For example, the temperature range satisfying the condition noted above in producing polycarbonate of bisphenol A may preferably fall between 150 and 260° C., more preferably between 180 and 230° C.

In order to heat the polymer being produced in the polymerization step as uniformly as possible and to advantageously remove the side products, for example, preferably employed is a method of stirring the reaction system, a method of rotating the reactor itself, or a method of fluidizing the reaction system by the action of a hot gas introduced thereinto.

Ordinary aromatic polycarbonates for industrial use generally have a weight-average molecular weight falling between 6,000 and 200,000 or so. The solid-phase polymerization noted above easily gives polycarbonates of which the degree of polymerization falls within the range as above for industrial use.

The degree of crystallinity of the aromatic polycarbonate as produced through the solid-phase polymerization of a crystalline prepolymer is generally larger than that of the starting prepolymer. In general, therefore, powdery, crystalline aromatic polycarbonates are obtained through the solid-phase polymerization. Without being cooled, the thus-obtained, powdery, crystalline aromatic polycarbonates may be directly introduced into extruders for pelletizing them, or into shaping machines for shaping them.

The proportions of the pre-polymerization that contributes to polymerization and the solid-phase polymerization may be varied in a broad range.

(ii) Polymerization in Swollen Solid-Phase State:

The prepolymer prepared in the pre-polymerization step is, after having been crystallized, swollen with a swelling gas that will be mentioned hereinunder, and then subjected to solid-phase polymerization.

This method comprises a flaking step in which the prepolymer having been prepared in the manner noted above is flaked, and a polymerization step (swollen solid-phase polymerization step) in which the resulting flaky prepolymer is polymerized in a solid phase while a swelling solvent is circulated in the reaction system.

The prepolymer favorable to the flaking step has a molecular weight falling between 1500 and 30000 in terms of the viscosity-average molecular weight (Mv). Prepolymers having a molecular weight lower than the defined range shall have a low melting point, for which the solid-phase polymerization temperature must be lowered. Therefore, such low-molecular prepolymers are unfavorable, as their reaction speed is low.

For the flaking, any known method is employable. For example, employable is any of rotary granulation, extrusion granulation, compression granulation, melting granulation, spray-drying granulation, fluidized-bed granulation, grinding granulation, stirring granulation, liquid-phase granulation, vacuum-freezing granulation, etc.

The shape of the prepolymer flakes is not specifically defined. In view of their easy handlability, preferred are pellets, beads and the like. In the next swollen solid-phase polymerization step, the prepolymer flakes are polymerized to have a higher molecular weight while they are still in a solid phase. This solid-phase polymerization step is effected in a swelling solvent atmosphere, and is characterized in that the side products, phenols are more efficiently removed due to the swelling effect of the solvent used. The reaction temperature for the polymerization in this step is much lowered as compared with that for ordinary melt transesterification, and, in addition, the reaction time for the former is much shortened as compared with that for ordinary solid-phase polymerization or melt transesterification.

The swelling solvent to be used herein includes a single swelling solvent capable of swelling polycarbonates under the condition to be mentioned hereinunder, a mixture of a plurality of such single swelling solvents, or a mixture comprising such a single swelling solvent or a mixture of the solvents and one or more bad solvents for polycarbonates. The swollen state in this step indicates that the volume or the weight of the starting prepolymer flakes is increased to a degree not lower than the thermal swelling value within the range of the reaction conditions to be mentioned hereinunder. The swelling solvent is a single compound of which the boiling point is so controlled that the compound completely vaporizes within the range of the reaction conditions to be mentioned hereinunder, or which has a vapor pressure of generally not lower than 50 mmHg under the defined reaction conditions, or a mixture of such compounds, and this shall have the ability to produce the swollen state noted above.

The swelling solvent is not specifically defined, provided that it satisfies the swelling conditions noted above. For example, aromatic compounds and nitrogen-containing compounds, of which the solubility parameter generally falls between 4 and 20 $(cal/cm^3)^{1/2}$, preferably between 7 and 14 $(cal/cm^3)^{1/2}$, may be used as the swelling solvent.

As specific examples of the swelling solvent, for example, mentioned are aromatic hydrocarbons such as benzene, toluene, xylene, ethylbenzene, diethylbenzene, propylbenzene, dipropylbenzene, etc.; ethers such as tetrahydrofuran, dioxane, etc.; ketones such as methyl ethyl ketone, methyl isobutyl ketone, etc. Of those, preferred are single compounds of aromatic hydrocarbons having from 6 to 20 carbon atoms, or their mixtures.

The conditions of the bad solvent to be mixed with the swelling solvent are that the solubility of polycarbonates in the bad solvent under the reaction conditions to be mentioned below is not larger than 0.1% by weight and that the bad solvent is almost inert to the reaction. As the bad solvent, preferred are linear or branched, saturated hydrocarbon compounds having from 4 to 18 carbon atoms, and low-degree unsaturated hydrocarbon compounds having from 4 to 18 carbon atoms. If, however, the boiling point of the swelling solvent and that of the bad solvent are both higher than 250° C., the removal of the solvents that may remain in the products will be difficult, thereby unfavorably resulting in that the quality of the products is lowered.

Where the bad solvent is mixed with the swelling solvent for use in the invention, the amount of the swelling solvent to be in the mixed solvent may be not smaller than 1% by weight, preferably not smaller than 5% by weight.

In the swollen solid-phase polymerization step, the reaction temperature preferably falls between 100 and 240° C. and the pressure during the reaction preferably falls between 10 Torr and 5 kg/cm²G. More preferably, the reaction is effected under atmospheric pressure. If the reaction temperature is lower than the defined range, the transesterification could not occur. However, if the reaction temperature is too high, for example, higher than the melting point of the prepolymer being polymerized, the reaction system could not be in a solid-phase state and the prepolymer grains will fuse together, whereby the reaction will be much retarded. Therefore, the reaction temperature is to be not higher than the melting point of the prepolymer.

Regarding the means of feeding the swelling solvent gas into the reaction system, the solvent of being in a liquid state may be fed into the reactor and is vaporized therein; or alternatively, the solvent is vaporized by the use of a heat exchanger or the like, and the solvent gas may be fed into the reactor. The flow rate of the swelling solvent gas may be not lower than $1 \times 10^{-3}$ cm/sec, preferably not lower than $1 \times 10^{-3}$ cm/sec. Regarding the amount of the gas to be fed, it is desirable that the gas is fed into the reactor in an amount of not smaller than 0.5 liters (in ordinary state)/hr, relative to 1 g of the prepolymer. The flow rate of the swelling solvent gas has close relation to the reaction speed. This is because the swelling solvent gas has the ability to remove phenols, while additionally acting as a heat carrier. Therefore, the increase in the gas flow rate brings about the increase in the reaction speed. The reactors to be used in the swollen solid-phase polymerization are not specifically defined.

For drying and pelletizing the polycarbonates having an increased molecular weight, any known method is employable with no specific limitation. Where additives such as those mentioned above are added to the polymers, it is desirable that the polymer flakes are, before or after dried, directly coated with powders of those additives, or liquid additives are sprayed over the polymer flakes so that the flakes may absorb the vapor of the additives. As the case may be, the additives may be mixed with the polymers in extruders while the polymers are pelletized.

The mixing ratio of the inert gas to the swelling solvent may be such that the swelling solvent is in the mixed solvent gas in an amount of not smaller than 1% by volume, preferably not smaller than 5% by volume.

(iii) Additives in Polymerization:

In the solid-phase polymerization or the swollen solid-phase polymerization in the invention, optionally but preferably used is a terminal-stopping agent such as p-t-butylphenol, p-cumylphenol, p-phenylphenol or the like. If further desired, any known chain-branching agent may be used. If still desired, any known antioxidant may be added to the reaction system. As the antioxidant, preferred are phosphorus-containing antioxidants.

(iv) Oxygen Concentration and Water Concentration in Vapor Phase in Polymerization System:

In the second and third aspects of the invention, the oxygen concentration in the vapor phase in the polymerization reaction system is preferably not larger than 2 ppm. To the fourth aspect of the invention, however, this condition is indispensable. The oxygen concentration is more preferably not larger than 1 ppm, even more preferably not larger than 0.5 ppm. It is desirable that the water concentration in the reaction system is not larger than 2 ppm, more preferably not larger than 1 ppm. If the oxygen concentration in the polymerization reaction system is larger than 2 ppm, the polymers to be obtained will be often colored and, in addition, their thermal stability is poor. On the other hand, if the water concentration therein is larger than 2 ppm, such is undesirable since the polymers being produced will be hydrolyzed and since the activity of the catalyst being used will be lowered.

The method for lowering the oxygen concentration in the reaction system to be not more than 2 ppm and for lowering the water concentration therein also to be not more than 2 ppm is not specifically defined. For example, an oxygen-removing duct equipped with an oxygen filter or the like and a water-removing duct equipped with a moisture filter or the like may be disposed before the polymerization reactor in the production line.

The polycarbonates as obtained according to the present invention may be mixed with any known additives of, for example, plasticizer, pigment, lubricating agent, mold-releasing agent, stabilizer, inorganic filler, etc., before they are used. Further if desired, any known antioxidant may be added to the reaction system of producing the polycarbonates. As the antioxidant, preferably used are phosphorus-containing antioxidants.

The polycarbonates may be blended with any other polymers, such as polyolefins, polystyrenes, polyesters, polysulfonates, polyamides, polyphenylene ethers, etc. In particular, they are effectively blended with polyphenylene ethers, polyether nitrites, terminal-modified polysiloxane compounds, modified polypropylenes, modified polystyrenes and the like having OH, COOH, $NH_2$ or the like group at their terminals.

The invention will be described in more detail hereinunder, which, however, are not whatsoever intended to restrict the scope of the invention.

EXAMPLES 1 to 4, AND COMPARATIVE EXAMPLES 1 and 2

22.8 g (0.1 mols) of bisphenol A (BPA) and 23.5 g (0.11 mols) of diphenyl carbonate were put into a 100-ml nickel steel autoclave equipped with a stirrer, along with a catalyst of which the type and the amount are shown in Table 1 below, and purged with argon five times in all. Next, the mixture was heated at 180° C. and reacted for 30 minutes in the argon atmosphere. Next, this was further heated up to 210° C. and reacted for 30 minutes with being gradually vacuumed up to 100 mmHg; then this was still further heated up to 240° C. and reacted for 30 minutes with being gradually vacuumed up to 10 mmHg; then this was still further heated up to 270° C. and reacted for 30 minutes with being vacuumed up to 2 mmHg; and finally, this was still further heated up to 290° C. and reacted for 30 minutes with being vacuumed up to 0.3 mmHg. In that manner, the reaction was finished.

Next, the viscosity-average molecular weight of the viscous transparent condensate (polycarbonate) thus produced in the autoclave was measured. The condensate was press-molded into test discs having a thickness of 1 mm and a diameter of 10 mm, which were then exposed to steam at 121° C. for 48 hours. The decrease in the viscosity-average molecular weight of the exposed sample was obtained, from which the steam resistance of the sample was evaluated.

The viscosity-average molecular weight Mv is obtained according to the following equation, in which [η] indicates the limiting viscosity in methylene chloride at 20° C.

$$[\eta]=1.23\times10^{-5}\times Mv^{0.83}$$

The condensate was subjected to a high-temperature high-humidity test. Briefly, the condensate was dried at 120° C. for 5 hours or longer, and press-molded into test discs having a diameter of 12 cm and a thickness of 1.2 mm, which were exposed to heat at 80° C. and 85% RH for 48 hours. The thus-exposed discs were observed with a transmission polarizing microscope, and the number of white spots having a diameter of not smaller than 10 μm seen in each sample was counted.

The data obtained are shown in Table 2.

EXAMPLE 5

22.8 g (0.1 mols) of bisphenol A (BPA) and 23.5 g (0.11 mols) of diphenyl carbonate were put into a 100-ml nickel steel autoclave equipped with a stirrer, along with a catalyst of which the type and the amount are shown in Table 1 below, and purged with argon five times in all. Next, the mixture was heated at 180° C. and reacted for 30 minutes in the argon atmosphere. Next, this was further heated up to 210° C. and reacted for 30 minutes with being gradually vacuumed up to 100 mmHg; then this was still further heated up to 240° C. and reacted for 30 minutes with being gradually vacuumed up to 10 mmHg, and then reacted for 30 minutes with being vacuumed up to 2 mmHg; then this was still further heated up to 260° C. and reacted for 30 minutes; and finally, this was still further heated up to 270° C. and reacted for 30 minutes with being vacuumed up to 0.3 mmHg. In that manner, the reaction was finished. The polycarbonate thus produced herein was tested in the same manner as in Example 1. The data obtained are shown in Table 2.

TABLE 1

| | Catalyst (a) | | Catalyst (b) | |
|---|---|---|---|---|
| | Type | Amount (mol/mol of BPA) | Type | Amount (mol/mol of BPA) |
| Example 1 | TBTB | $2.5 \times 10^{-4}$ | TPTB | $1 \times 10^{-5}$ |
| Example 2 | TBTB | $2.5 \times 10^{-4}$ | BPTB | $1 \times 10^{-5}$ |
| Example 3 | TBTB | $2.5 \times 10^{-4}$ | MOPTB | $1 \times 10^{-5}$ |
| Example 4 | TBTB | $2.5 \times 10^{-4}$ | TPPP | $1 \times 10^{-5}$ |
| Example 5 | TBTB | $2.5 \times 10^{-4}$ | HPTB | $1 \times 10^{-5}$ |
| Comparative Example 1 | TBTB | $2.5 \times 10^{-4}$ | — | — |
| Comparative Example 2 | TMAH | $2.5 \times 10^{-4}$ | NaOH | $1 \times 10^{-6}$ |

(Notes)
TBTB: Tetrabutylphosphonium tetraphenyl borate (Na < 10 ppm, C < 10 ppm, K < 10 ppm, Mg < 10 ppm)
TMAH: Tetramethylammonium hydroxide (Na < 1 ppb, Ca < 1 ppb, K < 1 ppb)
TPTB: Tetraphenylphosphonium tetraphenyl borate (Na < 1 ppm, Ca < 1 ppm, K < 1 ppm)
BPTB: Biphenyltriphenylphosphonium tetraphenyl borate (Na < 1 ppm, Ca < 1 ppm, K < 1 ppm)
MOPTB: Methoxyphenyltriphenylphosphonium tetraphenyl borate (Na < 1 ppm, Ca < 1 ppm, K < 1 ppm)
TPPP: Tetraphenylphosphonium phenoxide (Na < 1 ppm, Ca < 1 ppm, K < 1 ppm)
HPTB: Cyclohexyltriphenylphosphonium tetraphenyl borate (Na < 10 ppm, Ca < 10 ppm, K < 10 ppm, Mg < 10 ppm)

TABLE 2

| | Viscosity-Average Molecular Weight (Mv) | Steam Resistance Test (ΔMv) | High-Temperature High-Humidity Test (white spots/sample) |
|---|---|---|---|
| Example 1 | 16,000 | 600 | 1 |
| Example 2 | 17,500 | 700 | 2 |
| Example 3 | 19,000 | 700 | 2 |
| Example 4 | 18,000 | 800 | 1 |
| Example 5 | 15,000 | 500 | 0 |
| Comparative Example 1 | 5,100 | — | — |
| Comparative Example 2 | 20,000 | 3000 | 100 or more |

EXAMPLES 6 to 8, and COMPARATIVE EXAMPLES 3 and 4

228 g (1.0 mol) of bisphenol A (BPA) and 225 g (1.05 mols) of diphenyl carbonate were put into a one-liter nickel steel autoclave equipped with a stirrer, along with a catalyst which is shown in Table 3 below, and purged with argon five times in all. Next, the mixture was heated at 180° C. and reacted for 30 minutes in the argon atmosphere. Next, this was further heated up to 240° C. and reacted over a period of 120 minutes with being vacuumed up to 8 mmHg; then this was still further heated up to 270° C. and reacted over a period of 30 minutes with being vacuumed up to 7 mmHg; and finally, this was further vacuumed up to 1 mmHg and reacted for 5 minutes. After the reaction, the reactor was purged with argon to be at the atmospheric pressure, and the prepolymer produced therein was taken out and ground.

The number-average molecular weight of the prepolymer (as calculated from $^1$H-NMR) was 3500, and the hydroxyl terminal fraction thereof was 49.5%.

The thus-obtained prepolymer was dissolved in methylene chloride, to which was added paraxylene whereby was formed a powdery precipitate in the solution. This was concentrated into a solid, and then dried in vacuum to obtain a powdery prepolymer. One g of this powder was put into a SUS tube having a diameter of 10 mm and a length of 200 mm, into which was introduced nitrogen at 220° C. and at a flow rate of 50 ml/min. In that condition, the prepolymer was subjected to solid-phase polymerization for 90 minutes. The polycarbonate thus obtained as a result of the solid-phase polymerization was tested in the same manner as in Example 1. The data obtained are shown in Table 4.

EXAMPLES 9 and 10

Polycarbonates were produced in the same manner as in Examples 7 and 8, except that paraxylene but not nitrogen was introduced into the tube at a flow rate of 20 ml/min. The polycarbonates thus produced in the swollen solid-phase polymerization were tested in the same manner as in Example 1. The data obtained are shown in Table 4.

TABLE 3

| | Catalyst (a) | | Catalyst (b) | |
|---|---|---|---|---|
| | Type | Amount (mol/mol of BPA) | Type | Amount (mol/mol of BPA) |
| Example 6 | TBTB | $2.5 \times 10^{-4}$ | TPTB | $1 \times 10^{-5}$ |
| Example 7 | TBTB | $2.5 \times 10^{-4}$ | BPTB | $1 \times 10^{-5}$ |
| Example 8 | TBTB | $2.5 \times 10^{-4}$ | MOPTB | $1 \times 10^{-5}$ |
| Example 9 | TBTB | $2.5 \times 10^{-4}$ | TPPP | $1 \times 10^{-5}$ |
| Example 10 | TBTB | $2.5 \times 10^{-4}$ | HPTB | $1 \times 10^{-5}$ |
| Comparative Example 3 | TBTB | $2.5 \times 10^{-4}$ | — | — |
| Comparative Example 4 | TMAH | $2.5 \times 10^{-4}$ | NaOH | $1 \times 10^{-6}$ |

(Notes)
For the abbreviations and the properties of the catalyst components (a) and (b) in Table 3, referred to are those in Table 1.

TABLE 4

| | Viscosity-Average Molecular Weight (Mv) | Steam Resistance Test (ΔMv) | High-Temperature High-Humidity Test (white spots/sample) |
|---|---|---|---|
| Example 6 | 16,100 | 600 | 1 |
| Example 7 | 17,500 | 600 | 2 |
| Example 8 | 18,900 | 500 | 1 |
| Example 9 | 16,000 | 700 | 1 |
| Example 10 | 18,000 | 500 | 0 |
| Comparative Example 3 | 5,100 | — | — |
| Comparative Example 4 | 9,900 | — | — |

EXAMPLES 11 to 16, and COMPARATIVE EXAMPLES 5 and 6

228 g (1.0 mol) of bisphenol A (BPA), 225 g (1.05 mols) of diphenyl carbonate and 0.5 mmols of tetramethylammonium hydroxide were put into a one-liter nickel steel autoclave equipped with a stirrer, and purged with argon five times in all. Next, the mixture was heated at 180° C. and reacted for 30 minutes in the argon atmosphere. Next, this was further heated up to 240° C. and reacted over a period of 120 minutes with being vacuumed up to 8 mmHg; then this was still further heated up to 270° C. and reacted over a period of 30 minutes with being vacuumed up to 7 mmHg; and finally, this was further vacuumed up to 1 mmHg and reacted for 5 minutes. After the reaction, the reactor was purged with argon to be at the atmospheric pressure, and the prepolymer produced therein was taken out and ground.

The viscosity-average molecular weight of the prepolymer was obtained according to the method mentioned above, and it was 8700. The hydroxyl terminal fraction of the prepolymer was 50%.

The thus-obtained prepolymer was dissolved in methylene chloride, to which were added the catalyst shown in Table 5 below and then paraxylene whereby was formed a powdery precipitate in the solution. This was concentrated into a solid, and then dried in vacuum to obtain a powdery prepolymer. 4 g of this powder was put into a SUS tube having a diameter of 16 mm and a length of 200 mm, into which was introduced nitrogen at 220° C. and at a flow rate of 50 ml/min. In that condition, the prepolymer was subjected to solid-phase polymerization for 90 minutes. The polycarbonate obtained as a result of the reaction was exposed to a nitrogen stream atmosphere at 340° C. for 90 minutes, and its yellow index (YI) was measured (stay burning test). In the same manner as in Example 6, the polycarbonate was subjected to the high-temperature high-humidity test, while its viscosity-average molecular weight was measured. The data obtained are shown in Table 5.

EXAMPLES 17 to 19, and COMPARATIVE EXAMPLES 7 and 8

The same process as in Example 15 was repeated, except that paraxylene was introduced into the SUS tube at a flow rate of 20 g/hr in place of nitrogen introduced thereinto at a flow rate of 50 ml/min. The polycarbonates produced herein were treated and tested in the same manner as in Example 11. The data obtained are shown in Table 5.

EXAMPLE 20

9.2 mols of bisphenol A, 9.4 liters of an aqueous solution of 2.0 N sodium hydroxide, and 8 liters of methylene chloride were put into a 50-liter container equipped with a stirrer, and stirred, into which a large excess amount of phosgene was introduced for 30 minutes.

Next, 0.79 mols of phenol was reacted with this, and 0.4 mols of bisphenol A, 0.022 mols of triethylamine and 4.5 liters of an aqueous solution of 0.2 N sodium hydroxide were added thereto and reacted for 40 minutes. The aqueous phase and the organic phase thus formed were separated from each other. Thus was obtained a methylene chloride solution of a polycarbonate oligomer.

8 liters of the methylene chloride solution of the polycarbonate oligomer was mixed with 3.9 mols of bisphenol A, 400 g of an aqueous solution of 7.25 wt. % sodium hydroxide, 0.017 mols of triethylamine and 8 liters of methylene chloride, and reacted for 60 minutes with stirring them at 500 rpm.

After the reaction, the aqueous phase and the organic phase thus formed were separated from each other, and the organic phase was washed with pure water, an alkali (aqueous solution of 0.01 N sodium hydroxide), an acid (0.1 N hydrochloric acid) and pure water in that order. Thus was obtained an organic solvent solution of a polycarbonate prepolymer. A part of this was sampled, from which was removed methylene chloride to obtain a powdery prepolymer. According to the test method mentioned above, the viscosity-average molecular weight of the powdery prepolymer was measured, and it was 8,700.

The prepolymer thus formed in the organic solvent solution was ground, while the solvent methylene chloride was evaporated away, to obtain a powdery prepolymer.

This was polymerized in the same manner as in Example 11 to produce a polycarbonate. The resulting product, polycarbonate was tested in the same manner as in Example 11. The data obtained are shown in Table 5.

COMPARATIVE EXAMPLE 9

In the same manner as in Comparative Example 5, except that the prepolymer obtained in Example 20 was used, a polycarbonate was produced and tested. The data obtained are shown in Table 5.

EXAMPLE 21

In the same manner as in Example 14, except that the prepolymer obtained in Example 20 was used, a polycarbonate was produced and tested. The data obtained are shown in Table 5.

In the stay burning test in Table 5, each polycarbonate sample was exposed to a nitrogen stream atmosphere at 340° C. for 90 minutes, and a 2.4% methylene chloride solution of the thus-exposed sample was put into a quartz cell having a photo-guide length of 57 mm, through which the color of the sample was measured with a color meter, SM-3 Model (manufactured by Suga Testers Co.). From the data measured, obtained was the YI (yellow index) of the sample.

TABLE 5

| | Polymerization Catalyst | | Viscosity-Average | High-Temperature | Stay |
|---|---|---|---|---|---|
| | Type | Amount (mol/mol of BPA) | Molecular Weight (Mv) | High-Humidity Test (white spots/sample) | Burning Test (YI) |
| Example 11 | TPP | $1 \times 10^{-3}$ | 14,300 | 2 | 4 |
| Example 12 | TBP | $5 \times 10^{-3}$ | 15,000 | 5 | 6 |
| Example 13 | TPO | $1 \times 10^{-3}$ | 14,600 | 3 | 7 |
| Example 14 | TMAH | $1 \times 10^{-3}$ | 16,700 | 5 | 7 |
| Example 15 | TBTB | $1 \times 10^{-4}$ | 14,800 | 4 | 5 |
| Example 16 | DBN | $1 \times 10^{-3}$ | 16,100 | 4 | — |
| Comparative Example 5 | NaOH | $1 \times 10^{-6}$ | 9,900 | — | 15 |
| Comparative Example 6 | — | — | 8,700 | — | 6 |
| Example 17 | TPO | $1 \times 10^{-3}$ | 14,300 | 3 | — |
| Example 18 | TMAH | $1 \times 10^{-3}$ | 16,100 | 4 | 8 |
| Example 19 | TBTB | $1 \times 10^{-6}$ | 14,600 | 4 | 9 |
| Comparative Example 7 | NaOH | $1 \times 10^{-2}$ | 19,600 | 100 or more | 16 |
| Comparative Example 8 | — | $1 \times 10^{-3}$ | 6,700 | — | 6 |
| Example 20 | TPO | $1 \times 10^{-3}$ | 14,800 | 2 | 7 |
| Example 21 | TMAH | $1 \times 10^{-3}$ | 16,700 | 4 | 8 |
| Comparative Example 9 | NaOH | $1 \times 10^{-6}$ | 9,600 | — | 17 |

(Notes)
TPP: Triphenyl phosphate,
TBP: Tributylphosphine,
TPO: Triphenylphosphine oxide,
DBN: 1,5-Diazabicyclo[4,3,0]-5-nonene,
TMAH, TBTB: Same as in Table 1.

EXAMPLES 22 AND 23

228 g (1.0 mol) of bisphenol A (BPA), 225 g (1.05 mols) of diphenyl carbonate and 0.5 mmols of tetramethylammonium hydroxide were put into a one-liter nickel steel autoclave equipped with a stirrer, and purged with argon five times in all. Next, the mixture was heated at 180° C. and reacted for 30 minutes in the argon atmosphere. Next, this was further heated up to 240° C. and reacted over a period of 120 minutes with being vacuumed up to 8 mmHg; then this was still further heated up to 270° C. and reacted over a period of 30 minutes with being vacuumed up to 7 mmHg; and finally, this was further vacuumed up to 1 mmHg and reacted for 5 minutes. After the reaction, the reactor was purged with argon to be at the atmospheric pressure, and the prepolymer produced therein was taken out and ground.

The number-average molecular weight of the prepolymer (as calculated from $^1$H-NMR) was 4500. The hydroxyl terminal fraction of the prepolymer was 49.5%.

The thus-obtained prepolymer was dissolved in methylene chloride, to which were added the catalyst shown in Table 6 below and then paraxylene whereby was formed a powdery precipitate in the solution. This was concentrated into a solid, and then dried in vacuum to obtain a powdery prepolymer. One g of this powder was put into a SUS tube having a diameter of 10 mm and a length of 200 mm, into which was introduced nitrogen at 220° C. and at a flow rate of 50 ml/min. In that condition, the prepolymer was subjected to solid-phase polymerization for 90 minutes. In this step, an oxygen-removing duct (Indicating Oxygen Trap, manufactured by GL Science Co.) and a water-removing duct (Moisture Filter, manufactured by GL Science Co.) were disposed before the polymerization reactor in the production line, and the oxygen concentration in the reaction system was controlled to be not larger than 1.0 ppm and the water concentration therein was to be not larger than 0.5 ppm. The polycarbonate obtained as a result of the reaction was exposed to a nitrogen stream atmosphere at 340° C. for 90 minutes, and its yellow index (YI) was measured (stay burning test). In the same manner as in Example 6, the viscosity-average molecular weight of the polycarbonate was measured. The data obtained are shown in Table 6.

EXAMPLE 24

The same process as in Example 22 was repeated, except that only the oxygen-removing duct (Indicating Oxygen Trap, manufactured by GL Science Co.) was disposed but the water-removing duct was not. The data of the polycarbonate obtained are shown in Table 6.

COMPARATIVE EXAMPLE 10

The same process as in Example 22 was repeated, except that the oxygen-removing duct and the water-removing duct were not used. In this, the oxygen concentration in the reaction system was 5 ppm, and the water concentration therein was 5 ppm. The data of the polycarbonate obtained are shown in Table 6.

EXAMPLES 25 AND 26

The same process as in Examples 22 and 23 was repeated, except that paraxylene was introduced into the SUS tube at a flow rate of 20 g/hr in place of nitrogen introduced thereinto at a flow rate of 50 ml/min. Prior to being introduced into the SUS tube, paraxylene was distilled under normal pressure in nitrogen that had been passed through an oxygen-removing duct (Indicating Oxygen Trap, manufactured by GL Science Co.) and a water-removing duct (Moisture Filter, manufactured by GL Science Co.), and bubbled with the same nitrogen for 12 hours. In this, the oxygen concentration in the reaction system was not larger than 1.0 ppm, and the water concentration therein was 1 ppm. The data of the polycarbonates obtained are shown in Table 6.

COMPARATIVE EXAMPLE 11

The same process as in Example 25 was repeated, except that commercially-available paraxylene (manufactured by Wako Pure Chemicals Co.) was used. In this, the oxygen concentration in the reaction system was larger than 5 ppm, and the water concentration therein was larger than 10 ppm. The data of the polycarbonate obtained are shown in Table 6.

EXAMPLE 27

9.2 mols of bisphenol A, 9.4 liters of an aqueous solution of 2.0 N sodium hydroxide, and 8 liters of methylene chloride were put into a 50-liter container equipped with a stirrer, and stirred, into which a large excess amount of phosgene was introduced for 30 minutes.

Next, 0.79 mols of phenol was reacted with this, and 0.4 mols of bisphenol A, 0.022 mols of triethylamine and 4.5 liters of an aqueous solution of 0.2 N sodium hydroxide were added thereto and reacted for 40 minutes. The aqueous phase and the organic phase thus formed were separated from each other. Thus was obtained a methylene chloride solution of a polycarbonate oligomer.

8 liters of the methylene chloride solution of the polycarbonate oligomer was mixed with 3.9 mols of bisphenol A, 400 g of an aqueous solution of 7.25 wt. % sodium hydroxide, 0.017 mols of triethylamine and 8 liters of methylene chloride, and reacted for 60 minutes with stirring them at 500 rpm.

After the reaction, the aqueous phase and the organic phase thus formed were separated from each other, and the organic phase was washed with pure water, an alkali (aqueous solution of 0.01 N sodium hydroxide), an acid (0.1 N hydrochloric acid) and pure water in that order. Thus was obtained an organic solvent solution of a polycarbonate prepolymer. A part of this was sampled, from which was removed methylene chloride to obtain a powdery prepolymer. According to the test method mentioned above, the viscosity-average molecular weight of the powdery prepolymer was measured, and it was 8,700.

The prepolymer thus formed in the organic solvent solution was ground, while the solvent methylene chloride was evaporated away, to obtain a powdery prepolymer.

This was polymerized in the same manner as in Example 22 to produce a polycarbonate. The data of the resulting product, polycarbonate are shown in Table 6.

COMPARATIVE EXAMPLE 12

The same process as in Example 27 was repeated, except that the oxygen-removing duct and the water-removing duct were not used. In this, the oxygen concentration in the reaction system was 5 ppm, and the water concentration therein was 5 ppm. The data of the polycarbonate obtained are shown in Table 6.

TABLE 6

|  | Polymerization Catalyst | | Viscosity-Average Molecular Weight (Mv) | Stay Burning Test (YI) |
|---|---|---|---|---|
|  | Type | Amount (mol/mol of BPA) | | |
| Example 22 | HPTB | $1 \times 10^{-5}$ | 23,300 | 10 |
| Example 23 | BPTB | $1 \times 10^{-5}$ | 23,800 | 12 |
| Example 24 | HPTB | $1 \times 10^{-5}$ | 20,900 | 10 |
| Example 25 | HPTB | $1 \times 10^{-5}$ | 18,000 | 9 |
| Example 26 | BPTB | $1 \times 10^{-5}$ | 18,000 | 9 |
| Example 27 | HPTB | $1 \times 10^{-5}$ | 19,100 | 7 |
| Comparative Example 10 | HPTB | $1 \times 10^{-5}$ | 24,700 | 24 |
| Comparative Example 11 | HPTB | $1 \times 10^{-3}$ | 17,400 | 37 |
| Comparative Example 12 | HPTB | $1 \times 10^{-5}$ | 18,400 | 25 |

(Notes)
HPTB: Cyclohexyltriphenylphosphonium tetraphenyl borate
BPTB: Biphenyltriphenylphosphonium tetraphenyl borate

INDUSTRIAL APPLICABILITY

According to the method of the invention, high-quality polycarbonates having good appearance, high heat resistance and high hydrolysis resistance can be obtained extremely efficiently.

As having good properties such as those noted above, the polycarbonates obtained according to the method of the invention are favorably used in various fields, for example, in the field of electric and electronic appliances, in the field of automobiles, in the field of optical materials (for example, as materials for optical discs and photomagnetic discs), and in other various industrial fields.

What is claimed is:

1. A method for producing polycarbonates through melt transesterification, wherein is used a catalyst comprising (a) a phosphorus-containing basic compound and (b) a quaternary phosphonium salt having one or more groups selected from aryl groups and branched alkyl groups, provided that, when the phosphorus-containing basic compound (a) is a quaternary phosphonium salt, it differs from the quaternary phosphonium salt (b).

2. The method for producing polycarbonates as claimed in claim 1, wherein the phosphorus-containing basic compound (a) is a quaternary phosphonium salt in which the carbon atom directly bonding to the phosphorus atom does not have a branched structure.

3. Polycarbonates for optical materials, which are produced in the method of claim 1.

4. A method for producing polycarbonates through transesterification, which comprises pre-polymerization to prepare polycarbonate prepolymers followed by final polymerization of said prepolymers in a solid phase or in a swollen solid phase to produce the products, polycarbonates, and which is characterized in that a catalyst comprising (a) a phosphorus-containing basic compound and (b) a quaternary phosphonium salt having one or more groups selected from aryl groups and branched alkyl groups, provided that, when the phosphorus-containing basic compound (a) is a quaternary phosphonium salt, it differs from the quaternary phosphonium salt (b), is used in the pre-polymerization and in the final polymerization.

5. A method for producing polycarbonates through transesterification, which comprises pre-polymerization to prepare polycarbonate prepolymers followed by final polymerization of said prepolymers in a solid phase or in a swollen solid phase to produce the products, polycarbonates, and which is characterized in that a catalyst comprising (a) a phosphorus-containing basic compound is used in the pre-polymerization and a catalyst comprising (b) a quaternary phosphonium salt having one or more groups selected from aryl groups and branched alkyl groups, provided that, when the phosphorus-containing basic compound (a) is a quaternary phosphonium salt, it differs from the quaternary phosphonium salt (b), is used in the final polymerization.

6. The method for producing polycarbonates as claimed in claim 4, wherein the phosphorus-containing basic compound (a) is a quaternary phosphonium salt in which the carbon atom directly bonding to the phosphorus atom does not have a branched structure.

7. Polycarbonates for optical materials, which are produced in the method of claim 4.

8. A method for producing polycarbonates, which comprises preparing polycarbonate prepolymers in pre-polymerization followed by polymerizing said prepolymers in a solid phase or in a swollen solid phase in the presence of a catalyst of a tri-valent or penta-valent phosphorus compound.

9. A method for producing polycarbonates, which comprises preparing polycarbonate prepolymers in pre-polymerization followed by polymerizing said prepolymers in a solid phase or in a swollen solid phase in the presence of a catalyst of a nitrogen-containing organic basic compound.

10. Polycarbonates for optical materials, which are produced in the method of claim 8.

11. A method for producing polycarbonates by polymerizing polycarbonate prepolymers in a solid phase or in a swollen solid phase, wherein said prepolymers are polymerized in a vapor-phase atmosphere having an oxygen concentration of not larger than 2 ppm.

12. A method for producing polycarbonates by polymerizing polycarbonate prepolymers in a solid phase or in a swollen solid phase, wherein said prepolymers are polymerized in a vapor-phase atmosphere having an oxygen concentration of not larger than 2 ppm and a water concentration of not larger than 2 ppm.

13. The method for producing polycarbonates as claimed in claim 11, wherein a catalyst of a nitrogen-containing organic basic compound is used in preparing the polycarbonate prepolymers.

14. The method for producing polycarbonates as claimed in claim 11, wherein polycarbonate prepolymers are prepared and then polymerized in a solid phase or in a swollen solid phase in the presence of a catalyst of a quaternary phosphonium salt.

15. The method for producing polycarbonates as claimed in claim 5, wherein the phosphorus-containing basic compound (a) is a quaternary phosphonium salt in which the carbon atom directly bonding to the phosphorus atom does not have a branch structure.

16. Polycarbonates for optical materials, which are produced in the method of claim 5.

17. Polycarbonates for optical materials, which are produced in the method of claim 9.

18. A method for producing polycarbonates as claimed in claim 12, wherein a catalyst of a nitrogen-containing organic basic compound is used in preparing the polycarbonate prepolymers.

19. The method for producing polycarbonates as claimed in claim 12, wherein polycarbonate prepolymers are prepared and then polymerized in a solid phase or in a swollen solid phase in the presence of a catalyst of a quaternary phosphonium salt.

20. The method for producing polycarbonates as claimed in claim 12, which comprises transesterification of a dihydroxy compound and a dicarbonate to produce the polycarbonates.

21. The method of one of claims 1, 4, or 5, wherein:
a) said phosphorus-containing basic compound is selected from the group consisting of ethylphosphine, diethylphosphine, propylphosphine, dipropylphosphine, diisoamylphosphine, triethylphosphine, tri-n-propylphosphine, triisopropylphosphine, tri-n-butylphosphine, phenylphosphine, diphenylphosphine, phenylmethylphosphine, phenyldimethylphosphine, triphenylphosphine, tri-p-tolylphosphine, tri-o-tolylphosphine, tris(2,4-di-t-butylphenyl)phosphine, tris(p-methoxyphenyl)phosphine, dimethyl phosphite, trimethyl phosphite, diethyl phosphite, triethyl phosphite, dibutyl phosphite, tributyl phosphite, dipropyl phosphite, tripropyl phosphite, dipentyl phosphite, tripentyl phosphite, dinonyl phosphite, trinonyl phosphite, didecyl phosphite, tridecyl phosphite, dioctadecyl phosphite, trioctadecyl phosphite, diphenyl phosphite, triphenyl phosphite, tris(ethylphenyl) phosphite, tris(2,4-di-t-butylphenyl)phosphite, tris(nonylphenyl)phosphite, tris(hydroxyphenyl) phosphite, diphenyloctyl phosphite, diphelnyldecyl phosphite, phenyldidecyl phosphite, 4,4'-butylidene-bis(3-methyl-6-t-butylphenyl-ditridecyl)phosphite, 1,1, 3-tris(2-methyl-4-ditridecyl phosphito-5-t-butylphenyl)butane, 4,4'-isopropylidene-diphenolalkyl phosphites, tetraphenylphosphonium hydroxide, tetranaphthylphosphonium hydroxide, tetra (chlorophenyl)phosphonium hydroxide, tetra (biphenyl)phosphonium hydroxide, tetratolylphosphonium hydroxide, tetramethylphosphonium hydroxide, tetraethylphosphonium hydroxide, tetrabutylphosphonium hydroxide, tetramethylphosphonium tetraphenyl borate, tetraethylphosphonium tetraphenyl borate, tetrabutylphosphonium tetraphenyl borate, tetraphenylphosphonium bromide, tetraphenylphosphonium phenolate, tetraphenylphosphonium tetraphenyl borate, methyltriphenylphosphonium tetraphenyl borate, cyclohexyltriphenylphosphonium tetraphenyl borate, benzyltriphenylphosphonium tetraphenyl borate, biphenyltriphenylphosphonium tetraphenyl borate, tetratolylphosphonium tetraphenyl borate, tetraphenylphosphonium phenolate, tetra(p-t-butylphenyl)phosphonium diphenyl phosphate, triphenylbutylphosphonium phenolate, triphenylbutylphosphonium tetraphenyl borate, bis-tetraphenylphosphonium salt of 2,2-bis(4-hydroxyphenyl)propane, ethylenebis(triphenylphosphonium)dibromide, and trimethylenebis(triphenylphosphonium)-bis(tetraphenyl borate).

22. The method of one of claims 1, 4, or 5, wherein:
b) said quaternary phosphonium salt is selected from the group consisting of tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetracyclohexylphosphonium hydroxide, methyltriphenylphosphonium hydroxide, ethyltriphenylphosphonium hydroxide, propyltriphenylphosphonium hydroxide, butyltriphenylphosphonium hydroxide, octyltriphenylphosphonium hydroxide, tetradecyltriphenylphosphonium hydroxide, benzyltriphenylphosphonium hydroxide, ethoxybenzyltriphenylphosphonium hydroxide, methoxymethyltriphenylphosphonium hydroxide, acetoxymethyltriphenylphosphonium hydroxide, phenacyltriphenylphosphonium hydroxide, chloromethyltriphenylphosphonium hydroxide, bromomethyltriphenylphosphonium hydroxide, biphenyltriphenylphosphonium hydroxide, naphtyltriphenylphosphonium hydroxide, chlorophenyltriphenylphosphonium hydroxide, phenoxyphenyltriphenylphosphonium hydroxide, methoxyphenyltriphenylphosphonium hydroxide, acetoxyphenyltriphenylphosphonium hydroxide, naphtylphenyltriphenylphosphonium hydroxide, phenyltrimethylphosphonium hydroxide, biphenyltrimethylphosphonium hydroxide, phenyltrihexylphosphonium hydroxide, biphenyltrihexylphosphonium hydroxide, dimethyldiphenylphosphonium hydroxide, diethyldiphenylphosphonium hydroxide, di(biphenyl)diphenylphosphonium hydroxide, cyclohexyltriphenylphosphonium hydroxide, cylcopentyltriphenylphosphonium hydroxide, tetraphenylphosphonium tetraphenyl borate, tetranaphthylphosphonium tetraphenyl borate, tetra(chlorophenyl)phosphonium tetraphenyl borate, tetra(biphenyl)phosphonium tetraphenyl borate, tetratolylphosphonium tetraphenyl borate, methyltriphenylphosphonium tetraphenyl borate, ethyltriphenylphosphonium tetraphenyl borate, propyltriphenylphosphonium tetraphenyl borate, butyltriphenylphosphonium tetraphenyl borate, octyltriphenylphosphonium tetraphenyl borate, tetradecyltriphenylphosphonium tetraphenyl borate, cyclohexyltriphenylphosphonium tetraphenyl borate, cyclopentyltriphenylphosphonium tetraphenyl borate, benzyltriphenylphosphonium tetraphenyl borate, ethoxybenzyltriphenylphosphonium tetraphenyl borate, methoxymethyltriphenylphosphonium tetraphenyl borate, acetoxymethyltriphenylphosphonium tetraphenyl borate, phenacyltriphenylphosphonium tetraphenyl borate, chloromethyltriphenylphosphonium tetraphenyl borate, bromomethyltriphenylphosphonium tetraphenyl borate, biphenyltriphenylphosphonium tetraphenyl borate, naphtyltriphenylphosphonium tetraphenyl borate, chlorophenyltriphenylphosphonium tetraphenyl borate, phenoxyphenyltriphenylphosphonium tetraphenyl borate, acetoxyphenyltriphenylphosphonium tetraphenyl borate, naphthylphenyltriphenylphosphonium tetraphenyl borate, phenyltrimethylphosphonium tetraphenyl borate, biphenyltrimethylphosphonium tetraphenyl borate, phenyltrihexylphosphonium tetraphenyl borate, biphenyltrihexylphosphonium tetraphenyl borate, dimethyldiphenylphosphonium tetraphenyl borate, diethyldiphenylphosphonium tetraphenyl borate, di(biphenyl)diphenylphosphonium tetraphenyl borate, tetraphenylphosphonium phenoxide, tetranaphthylphosphonium phenoxide, tetra(chlorophenyl)phosphonium phenoxide, tetra(biphenyl)phosphonium phenoxide, tetratolylphosphonium phenoxide, tetracyclohexylphosphonium phenoxide, methyltriphenylphosphonium phenoxide, ethyttriphenylphosphonium phenoxide, propyltriphenylphosphonium phenoxide, butyltriphenylphosphonium phenoxide, octyltriphenylphosphonium phenoxide, tetradecyltriphenylphosphonium phenoxide, benzyltriphenylphosphonium phenoxide, ethoxybenzyltriphenylphosphonium phenoxide, methoxymethyltriphenylphosphonium phenoxide, acetoxymethyltriphenylphosphonium phenoxide, phenacyltriphenylphosphonium phenoxide, chloromethyltriphenylphosphonium phenoxide, bromomethyltriphenylphosphonium phenoxide, biphenyltriphenylphosphonium phenoxide, naphtyltriphenylphosphonium phenoxide, chlorophenyltriphenylphosphonium phenoxide, phenoxyphenyltriphenylphosphonium phenoxide, methoxyphenyltriphenylphosphonium phenoxide, acetoxyphenyltriphenylphosphonium phenoxide, naphtylphenyltriphenylphosphonium phenoxide, phenyltrimethylphosphonium phenoxide, biphenyltrimethylphosphonium phenoxide, phenyltrihexylphosphonium phenoxide, biphenyltrihexylphosphonium phenoxide, dimethyldiphenylphosphonium phenoxide, diethyldiphenylphosphonium phenoxide, di(biphenyl)diphenylphosphonium phenoxide, cyclohexyltriphenylphosphonium phenoxide, cyclopentyltriphenylphosphonium phenoxide, tetraphenylphosphonium methoxide, tetranaphthylphosphonium methoxide, tetra(chlorophenyl)phosphonium methoxide, tetra(biphenyl)phosphonium methoxide, tetratolylphosphonium methoxide, tetracyclohexylphosphonium methoxide, methyltriphenylphosphonium methoxide, ethyltriphenylphosphonium methoxide, propyltriphenylphosphonium methoxide, butyltriphenylphosphonium methoxide, octyltriphenylphosphonium methoxide, tetradecyltriphenylphosphonium methoxide, benzyltriphenylphosphonium methoxide, ethoxybenzyltriphenylphosphonium methoxide, methoxymethyltriphenylphosphonium methoxide, acetoxymethyltriphenylphosphonium methoxide, phenacyltriphenylphosphonium methoxide, chloromethyltriphenylphosphonium methoxide, bromomethyltriphenylphosphonium methoxide, biphenyltriphenylphosphonium methoxide, naphtyltriphenylphosphonium methoxide, chlorophenyltriphenylphosphonium methoxide, phenoxyphenyltriphenylphosphonium methoxide, methoxyphenyltriphenylphosphonium methoxide, acetoxyphenyltriphenylphosphonium methoxide, naphtylphenyltriphenylphosphonium methoxide, phenyltrimethylphosphonium methoxide, biphenyltrimethylphosphonium methoxide, phenyltrihexylphosphonium methoxide, biphenyltrihexylphosphonium methoxide, dimethyldiphenylphosphonium methoxide, diethyldiphenylphosphonium methoxide, di(biphenyl)diphenylphosphonium methoxide, cyclohexyltriphenylphosphonium methoxide, cyclopentyltriphenylphosphonium methoxide, tetraphenylphosphonium ethoxide, tetranaphthylphosphonium ethoxide, tetra(chlorophenyl)phosphonium ethoxide, tetra(biphenyl)phosphonium ethoxide, tetratolylphosphonium ethoxide, tetracyclohexylphosphonium ethoxide, methyltriphenylphosphonium ethoxide, ethyltriphenylphosphonium ethoxide, propyltriphenylphosphonium ethoxide, butyltriphenylphosphonium ethoxide, octyltriphenylphosphonium ethoxide, tetradecyltriphenylphosphonium ethoxide, benzyltriphenylphosphonium ethoxide, ethoxybenzyltriphenylphosphonium ethoxide, methoxymethyltriphenylphosphonium ethoxide, acetoxymethyltriphenylphosphonium ethoxide, phenacyltriphenylphosphonium ethoxide, chloromethyltriphenylphosphonium ethoxide, bromomethyltriphenylphosphonium ethoxide, biphenyltriphenylphosphonium ethoxide, naphtyltriphenylphosphonium ethoxide, chlorophenyltriphenylphosphonium ethoxide, phenoxyphenyltriphenylphosphonium ethoxide, methoxyphenyltriphenylphosphonium ethoxide, acetoxyphenyltriphenylphosphonium ethoxide, naphtylphenyltriphenylphosphonium ethoxide, phenyltrimethylphosphonium ethoxide, biphenyltrimethylphosphonium ethoxide, phenyltrihexylphosphonium ethoxide, biphenyltrihexylphosphonium ethoxide, dimethyldiphenylphosphonium ethoxide, diethyldiphenylphosphonium ethoxide, di(biphenyl)diphenylphosphonium ethoxide, cyclohexyltriphenylphosphonium ethoxide, cyclopentyltriphenylphosphonium ethoxide, tetraphenylphosphonium acetate, tetranaphthylphosphonium acetate, tetra(chlorophenyl)phosphonium acetate, tetra(biphenyl)phosphonium acetate, tetratolylphosphonium acetate, tetracyclohexylphosphonium acetate, methyltriphenylphosphonium acetate, ethyltriphenylphosphonium acetate, propyltriphenylphosphonium acetate, butyltriphenylphosphonium acetate, octyltriphenylphosphonium acetate, tetradecyltriphenylphosphonium acetate, benzyltriphenylphosphonium acetate, ethoxybenzyltriphenylphosphonium acetate, methoxymethyltriphenylphosphonium acetate, acetoxymethyltriphenylphosphonium acetate, phenacyltriphenylphosphonium acetate, chloromethyltriphenylphosphonium acetate, bromomethyltriphenylphosphonium acetate, biphenyltriphenylphosphonium acetate, naphtyltriphenylphosphonium acetate, chlorophenyltriphenylphosphoniurn acetate, phenoxyphenyltriphenylphosphonium acetate, methoxyphenyltriphenylphosphonium acetate, acetoxyphenyltriphenylphosphonium acetate, naphtylphenyltriphenylphosphonium acetate, phenyltrimethylphosphonium acetate, biphenyltrimethylphosphonium acetate, phenyltrihexylphosphonium acetate, biphenyltrihexylphosphonium acetate, dimethyldiphenylphosphonium acetate, diethyldiphenylphosphonium acetate, di(biphenyl)diphenylphosphonium acetate, cyclohexyltriphenylphosphonium acetate, cyclopentyltriphenylphosphonium acetate, tetraphenylphosphonium benzoate, tetranaphthylphosphonium benzoate, tetra(chlorophenyl)phosphonium benzoate, tetra(biphenyl)phosphonium benzoate, tetratolylphosphonium benzoate, tetracyclohexylphosphonium benzoate, methyltriphenylphosphonium benzoate, ethyltriphenylphosphonium benzoate, propyltriphenylphosphonium benzoate, butyltriphenylphosphonium benzoate, octyltriphenylphosphonium benzoate, tetradecyltriphenylphosphonium benzoate, benzyltriphenylphosphonium benzoate, ethoxybenzyltriphenylphosphonium benzoate, methoxymethyltriphenylphosphonium benzoate, acetoxymethyltriphenylphosphonium benzoate, phenacyltriphenylphosphonium benzoate, chloromethyltriphenylphosphonium benzoate, bromomethyltriphenylphosphonium benzoate, biphenyltriphenylphosphonium benzoate, naphtyltriphenylphosphonium benzoate, chlorophenyltriphenylphosphonium benzoate, phenoxyphenyltriphenylphosphonium benzoate, methoxyphenyltriphenylphosphonium benzoate, acetoxyphenyltriphenylphosphonium benzoate, naphtylphenyltriphenylphosphonium benzoate, phenyltrimethylphosphonium benzoate, biphenyltrimethylphosphonium benzoate, phenyltrihexylphosphonium benzoate, biphenyltrihexylphosphonium benzoate, dimethyldiphenylphosphonium benzoate, diethyldiphenylphosphonium benzoate, di(biphenyl)diphenylphosphonium benzoate, cyclohexyltriphenylphosphonium benzoate, cyclopentyltriphenylphosphonium benzoate, tetraphenyl phosphonium chloride, tetranaphthyl phosphonium chloride, tetra(chlorophenyl)phosphonium chloride, tetra(biphenyl)phosphonium chloride, tetratolylphehphohonium chloride, tetracyclohexylphosphonium chloride, methyltriphenylphosphonium chloride, ethyltriphenylphosphonium chloride, propyltriphenylphosphonium chloride, butyltriphenylphosphonium chloride, octyltriphenylphosphonium chloride, tetradecyltriphenylphosphonium chloride, benzyltriphenylphosphonium chloride, ethoxybenzyltriphenylphosphonium chloride, methoxymethyltriphenylphosphonium chloride, acetoxymethyltriphenylphosphonium chloride, phenacyltriphenylphosphonium chloride, chloromethyltriphenylphosphonium chloride, bromomethyltriphenylphosphonium chloride, biphenyltriphenylphosphonium chloride, naphtyltriphenylphosphonium chloride, chlorophenyltriphenylphosphonium chloride, phenoxyphenyltriphenylphosphonium chloride, methoxyphenyltriphenylphosphonium chloride, acetoxyphenyltriphenylphosphonium chloride, naphtylphenyltriphenylphosphonium chloride, phenyltrimethylphosphonium chloride, biphenyltrimethylphosphonium chloride, phenyltrihexylphosphonium chloride, biphenyltrihexylphosphonium chloride, dimethyldiphenylphosphonium chloride, diethyldiphenylphosphonium chloride, di(biphenyl)diphenylphosphonium chloride, cyclohexyltriphenylphosphonium chloride, cyclopentyltriphenylphosphonium chloride, tetraphenylphosphonium bromide, tetranaphthylphosphonium bromide, tetra(chlorophenyl)phosphonium bromide, tetra(biphenyl)phosphonium bromide, tetratolylphosphonium bromide, tetracyclohexylphosphonium bromide, methyltriphenylphosphonium bromide, ethyltriphenylphosphonium bromide, propyltriphenylphosphonium bromide, butyltriphenylphosphonium bromide, octyltriphenylphosphonium bromide, tetradecyltriphenylphosphonium bromide, benzyltriphenylphosphonium bromide, ethoxybenzyltriphenylphosphonium bromide, methoxymethyltriphenylphosphonium bromide, acetoxymethyltriphenylphosphonium bromide, phenacyltriphenylphosphonium bromide, chloromethyltriphenylphosphonium bromide, bromomethyltriphenylphosphonium bromide, biphenyltriphenylphosphonium bromide, naphtyltriphenylphosphonium bromide, chlorophenyltriphenylphosphonium bromide, phenoxyphenyltriphenylphosphonium bromide, methoxyphenyltriphenylphosphonium bromide, acetoxyphenyltriphenylphosphonium bromide, naphtylphenyltriphenylphosphonium bromide, phenyltrimethylphosphonium bromide, biphenyltrimethylphosphonium bromide, phenyltrihexylphosphonium bromide, biphenyltrihexylphosphonium bromide, dimethyldiphenylphosphonium bromide, diethyldiphenylphosphonium bromide, di(biphenyl)diphenylphosphonium bromide, cyclohexyltriphenylphosphonium bromide, cyclopentyltriphenylphosphonium bromide, bis(tetraphenylphosphonium)carbonate, bis(biphenyltriphenylphosphonium)carbonate, bis-tetraphenylphosphonium salt of 2,2-bis(4-hydroxyphenyl)propane, ethylenebis(triphenylphosphonium)dibromide, trimethylenebis(triphenylphosphonium)-bis(tetraphenyl borate), methoxyphenyltriphenylphosphonium tetraphenyl borate, isopropyltriethylphosphonium hydroxide, isopropyltributylphosphonium hydroxide, isopropyltriphenylphosphonium hydroxide, tetraisopropylphosphonium hydroxide, cyclohexyltriethylphosphonium hydroxide, cyclohexyltrimethylphosphonium hydroxide, cyclohexyltributylphosphonium hydroxide, tetracyclohexylphosphonium hydroxide, 1,1,1-triphenylmethyltrimethylphosphonium hydroxide, 1,1,1-triphenylmethyltriethylphosphonium hydroxide, 1,1,1-triphenylmethyltributylphosphonium hydroxide, 1,1,1-triphenylmethyltriphenylphosphonium hydroxide, isopropyltrimethylphosphonium hydroxide, isopropyltriethylphosphonium borohydride, isopropyltributylphosphonium borohydride, isopropyltriphenylphosphonium borohydride, tetraisopropylphosphonium borohydride, cyclohexyltriethylphosphonium borohydride, cyclohexyltrimethylphosphonium borohydride, cyclohexyltributylphosphonium borohydride, tetracyclohexylphosphonium borohydride, 1,1,1-triphenylmethyltrimethylphosphonium borohydride, 1,1,1-triphenylmethyltriethylphosphonium borohydride, 1,1,1-triphenylmethyltributylphosphonium borohydride, 1,1,1-triphenylmethyltriphenylphosphonium borohydride, isopropyltrimethylphosphonium borohydride, isopropyltriethylphosphonium tetraphenyl borate, isopropyltributylphosphonium tetraphenyl borate, isopropyltriphenylphosphonium tetraphenyl borate, tetraisopropylphosphonium tetraphenyl borate, cyclohexyltriethylphosphonium tetraphenyl borate, cyclohexyltrimethylphosphonium tetraphenyl borate, cyclohexyltributylphosphonium tetraphenyl borate, tetracyclohexylphosphonium tetraphenyl borate, 1,1,1-triphenylmethyltrimethylphosphonium tetraphenyl borate, 1,1,1-triphenylmethyltriethylphosphonium tetraphenyl borate, 1,1,1-triphenylmethyltributylphosphonium tetraphenyl borate, 1,1,1-triphenylmethyltriphenylphosphonium tetraphenyl borate, isopropyltrimethylphosphonium tetraphenyl borate, isopropyltriethylphosphonium acetate, isopropyltributylphosphonium acetate, isopropyltriphenylphosphonium acetate, tetraisopropylphosphonium acetate, cyclohexyltriethylphosphonium acetate, cyclohexyltrimethylphosphonium acetate, cyclohexyltributylphosphonium acetate, tetracyclohexylphosphonium acetate, 1,1,1-triphenylmethyltrimethylphosphonium acetate, 1,1,1-triphenylmethyltriethylphosphonium acetate, 1,1,1-triphenylmethyltributylphosphonium acetate, 1,1,1-triphenylmethyltriphenylphosphonium acetate, isopropyltrimethylphosphonium acetate, isopropyltriethylphosphonium propionate, isopropyltributylphosphonium propionate, isopropyltriphenylphosphonium propionate, tetraisopropylphosphonium propionate, cyclohexyltriethylphosphonium propionate, cyclohexyltrimethylphosphonium propionate, cyclohexyltributylphosphonium propionate, tetracyclohexylphosphonium propionate, 1,1,1-triphenylmethyltrimethylphosphonium propionate, 1,1,1-triphenylmethyltriethylphosphonium propionate, 1,1,1-triphenylmethyltributylphosphonium propionate, 1,1,1-triphenylmethyltriphenylphosphonium propionate, isopropyltrimethylphosphonium propionate, isopropyltriethylphosphonium fluoride, isopropyltributylphosphonium fluoride, isopropyltriphenylphosphonium fluoride, tetraisopropylphosphonium fluoride, cyclohexyltriethylphosphonium fluoride, cyclohexyltrimethylphosphonium fluoride, cyclohexyltributylphosphonium fluoride, tetracyclohexylphosphonium fluoride, 1,1,1-triphenylmethyltrimethylphosphonium fluoride, 1,1,1-triphenylmethyltriethylphosphonium fluoride, 1,1,1-triphenylmethyltributylphosphonium fluoride, 1,1,1-triphenylmethyltriphenylphosphonium fluoride, isopropyltrimethylphosphonium fluoride, isopropyltriethylphosphonium chloride, isopropyltributylphosphonium chloride, isopropyltriphenylphosphonium chloride, tetraisopropylphosphonium chloride, cyclohexyltriethylphosphonium chloride, cyclohexyltrimethylphosphonium chloride, cyclohexyltributylphosphonium chloride, tetracyclohexylphosphonium chloride, 1,1,1-triphenylmethyltrimethylphosphonium chloride, 1,1,1-triphenylmethyltriethylphosphonium chloride, 1,1,1-triphenylmethyltributylphosphonium chloride, 1,1,1-triphenylmethyltriphenylphosphonium chloride, isopropyltrimethylphosphonium chloride, isopropyltriethylphosphonium hydrocarbonate, isopropyltributylphosphonium hydrocarbonate, isopropyltriphenylphosphonium hydrocarbonate, tetraisopropylphosphonium hydrocarbonate, cyclohexyltriethylphosphonium hydrocarbonate, cyclohexyltrimethylphosphonium hydrocarbonate, cyclohexyltributylphosphonium hydrocarbonate, tetracyclohexylphosphonium hydrocarbonate, 1,1,1-triphenylmethyltrimethylphosphonium hydrocarbonate, 1,1,1-triphenylmethyltriethylphosphonium hydrocarbonate, 1,1,1-triphenylmethyltributylphosphonium hydrocarbonate, 1,1,1-triphenylmethyltriphenylphosphonium hydrocarbonate, isopropyltrimethylphosphonium hydrocarbonate, and bis(isopropyltriethylphosphonium)carbonate.

23. The method of one of claims 1, 4, or 5, wherein:
a) said phosphorus-containing basic compound is selected from the group consisting of ethylphosphine, diethylphosphine, propylphosphine, dipropylphosphine, diisoamylphosphine, triethylphosphine, tri-n-propylphosphine, triisopropylphosphine, tri-n-butylphosphine, phenylphosphine, diphenylphosphine, phenylmethylphosphine, phenyldimethylphosphine, triphenylphosphine, tri-p-tolylphosphine, tri-o-tolylphosphine, tris(2,4-di-t-butylphenyl)phosphine, tris(p-methoxyphenyl)phosphine, dimethyl phosphite, trimethyl phosphite, diethyl phosphite, triethyl phosphite, dibutyl phosphite, tributyl phosphite, dipropyl phosphite, tripropyl phosphite, dipentyl phosphite, tripentyl phosphite, dinonyl phosphite, trinonyl phosphite, didecyl phosphite, tridecyl phosphite, dioctadecyl phosphite, trioctadecyl phosphite, diphenyl phosphite, triphenyl phosphite, tris(ethylphenyl) phosphite, tris(2,4-di-t-butylphenyl)phosphite, tris(nonylphenyl)phosphite, tris(hydroxyphenyl) phosphite, diphenyloctyl phosphite, diphenyldecyl phosphite, phenyldidecyl phosphite, 4,4'-butylidenebis(3-methyl-6-t-butylphenyl-ditridecyl)phosphite, 1,1,3-tris(2-methyl-4-ditridecyl phosphito-5-t-butylphenyl)butane, 4,4'-isopropylidene-diphenolalkyl phosphites, tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetramethylphosphonium hydroxide, tetraethylphosphonium hydroxide, tetrabutylphosphonium hydroxide, tetramethylphosphonium tetraphenyl borate, tetraethylphosphonium tetraphenyl borate, tetrabutylphosphonium tetraphenyl borate, tetraphenylphosphonium bromide, tetraphenylphosphonium phenolate, tetraphenylphosphonium tetraphenyl borate, methyltriphenylphosphonium tetraphenyl borate, cyclohexyltriphenylphosphonium tetraphenyl borate, benzyltriphenylphosphonium tetraphenyl borate, biphenyltriphenylphosphonium tetraphenyl borate, tetratolylphosphonium tetraphenyl borate, tetraphenylphosphonium phenolate, tetra(p-t-butylphenyl)phosphonium diphenyl phosphate, triphenylbutylphosphonium phenolate, triphenylbutylphosphonium tetraphenyl borate, bis-tetraphenylphosphonium salt of 2,2-bis(4-hydroxyphenyl)propane, ethylenebis(triphenylphosphonium)dibromide, and trimethylenebis(triphenylphosphonium)bis(tetraphenyl borate); and
b) said quaternary phosphonium salt is selected from the group consisting of tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetracyclohexylphosphonium hydroxide, methyltriphenylphosphonium hydroxide, ethyltriphenylphosphonium hydroxide, propyltriphenylphosphonium hydroxide, butyltriphenylphosphonium hydroxide, octyltriphenylphosphonium hydroxide, tetradecyltriphenylphosphonium hydroxide, benzyltriphenylphosphonium hydroxide, ethoxybenzyltriphenylphosphonium hydroxide, methoxymethyltriphenylphosphonium hydroxide, acetoxymethyltriphenylphosphonium hydroxide, phenacyltriphenylphosphonium hydroxide, chloromethyltriphenylphosphonium hydroxide, bromomethyltriphenylphosphonium hydroxide, biphenyltriphenylphosphonium hydroxide, naphtyltriphenylphosphonium hydroxide, chlorophenyltriphenylphosphonium hydroxide, phenoxyphenyltriphenylphosphonium hydroxide, methoxyphenyltriphenylphosphonium hydroxide, acetoxyphenyltriphenylphosphonium hydroxide, naphtylphenyltriphenylphosphonium hydroxide, phenyltrimethylphosphonium hydroxide, biphenyltrimethylphosphonium hydroxide, phenyltrihexylphosphonium hydroxide, biphenyltrihexylphosphonium hydroxide, dimethyldiphenylphosphonium hydroxide, diethyldiphenylphosphonium hydroxide, di(biphenyl)diphenylphosphonium hydroxide, cyclohexyltriphenylphosphonium hydroxide, cylcopentyltriphenylphosphonium hydroxide, tetraphenylphosphonium tetraphenyl borate, tetranaphthylphosphonitiun tetraphenyl borate, tetra(chlorophenyl)phosphonium tetraphenyl borate, tetra(biphenyl)phosphonium tetraphenyl borate, tetratolylphosphonium tetraphenyl borate, methyltriphenylphosphonium tetraphenyl borate, ethyltriphenylphosphonium tetraphenyl borate, propyltriphenylphosphonium tetraphenyl borate, butyltriphenylphosphonium tetraphenyl borate, octyltriphenylphosphonium tetraphenyl borate, tetradecyltriphenylphosphonium tetraphenyl borate, cyclohexyltriphenylphosphonium tetraphenyl borate, cyclopentyltriphenylphosphonium tetraphenyl borate, benzyltriphenylphosphonium tetraphenyl borate, ethoxybenzyltriphenylphosphonium tetraphenyl borate, methoxymethyltriphenylphosphonium tetraphenyl borate, acetoxymethyltriphenylphosphonium tetraphenyl borate, phenacyltriphenylphosphonium tetraphenyl borate, chloromethyltriphenylphosphonium tetraphenyl borate, bromomethyltriphenylphosphonium tetraphenyl borate, biphenyltriphenylphosphoniurn tetraphenyl borate, naphtyltriphenylphosphonium tetraphenyl borate, chlorophenyltriphenylphosphonium tetraphenyl borate, phenoxyphenyltriphenylphosphonium tetraphenyl borate, acetoxyphenyltriphenylphosphonium tetraphenyl borate, naphthylphenyltriphenylphosphonium tetraphenyl borate, phenyltrimethylphosphonium tetraphenyl borate, biphenyltrimethylphosphonium tetraphenyl borate, phenyltrihexylphosphonium tetraphenyl borate, biphenyltrihexylphosphonium tetraphenyl borate, dimethyldiphenylphosphonium tetraphenyl borate, diethyldiphenylphosphonium tetraphenyl borate, di(biphenyl)diphenylphosphonium tetraphenyl borate, tetraphenylphosphonium phenoxide, tetranaphthylphosphonium phenoxide, tetra(chlorophenyl)phosphonium phenoxide, tetra(biphenyl)phosphonium phenoxide, tetratolylphosphonium phenoxide, tetracyclohexylphosphonium phenoxide, methyltriphenylphosphonium phenoxide, ethyltriphenylphosphonium phenoxide, propyltriphenylphosphonium phenoxide, butyltriphenylphosphonium phenoxide, octyltriphenylphosphonium phenoxide, tetradecyltriphenylphosphonium phenoxide, benzyltriphenylphosphonium phenoxide, ethoxybenzyltriphenylphosphonium phenoxide, methoxymethyltriphenylphosphonium phenoxide, acetoxymethyltriphenylphosphonium phenoxide, phenacyltriphenylphosphonium phenoxide, chloromethyltriphenylphosphonium phenoxide, bromomethyltriphenylphosphonium phenoxide, biphenyltriphenylphosphonium phenoxide, naphtyltriphenylphosphonium phenoxide, chlorophenyltriphenylphosphoniumin phenoxide, phenoxyphenyltriphenylphosphonium phenoxide, methoxyphenyltriphenylphosphonium phenoxide, acetoxyphenyltriphenylphosphoniiin phenoxide, naphtylphenyltriphenylphosphonium phenoxide, phenyltrimethylphosphonium phenoxide, biphenyltrimethylphosphonium phenoxide, phenyltrihexylphosphonium phenoxide, biphenyltrihexylphosphonium phenoxide, dimethyldiphenylphosphonium phenoxide, diethyldiphenylphosphonium phenoxide, di(biphenyl)diphenylphosphonium phenoxide, cyclohexyltriphenylphosphonium phenoxide, cyclopentyltriphenylphosphonium phenoxide, tetraphenylphosphonium methoxide, tetranaphthylphosphonium methoxide, tetra(chlorophenyl)phosphonium methoxide, tetra(biphenyl)phosphonium methoxide, tetratolylphosphonium methoxide, tetracyclohexylphosphonium methoxide, methyltriphenylphosphonium methoxide, ethyltriphenylphosphonium methoxide, propyltriphenylphosphonium methoxide, butyltriphenylphosphonium methoxide, octyltriphenylphosphonium methoxide, tetradecyltriphenylphosphonium methoxide, benzyltriphenylphosphonium methoxide, ethoxybenzyltriphenylphosphonium methoxide, methoxymethyltriphenylphosphonium methoxide, acetoxymethyltriphenylphosphonium methoxide, phenacyltriphenylphosphonium methoxide, chloromethyltriphenylphosphonium methoxide, bromomethyltriphenylphosphonium methoxide, biphenyltriphenylphosphonium methoxide, naphtyltriphenylphosphonium methoxide, chlorophenyltriphenylphosphonium methoxide, phenoxyphenyltriph enylphosphonium methoxide, methoxyphenyltriphenylphosphonium methoxide, acetoxyphenyltriphenylphosphonium methoxide, naphtylphenyltriphenylphosphonium methoxide, phenyltrimethylphosphonium methoxide, biphenyltrimethylphosphonium methoxide, phenyltrihexylphosphonium methoxide, biphenyltrihexylphosphonium methoxide, dimethyldiphenylphosphonium methoxide, diethyldiphenylphosphonium methoxide, di(biphenyl)diphenylphosphonium methoxide, cyclohexyltriphenylphosphonium methoxide, cyclopentyltriphenylphosphonium methoxiethoxide, tetraphenylphosphonium ethoxide, tetranaphthyl phosphonium ethoxide, tetra(chlorophenyl)phosphonium ethoxide, tetra(biphenyl)phosphonium ethoxide, tetratolyl phosphonium ethoxide, tetracyclohexylphysphohonium ethoxide, methyltriphenylphosphonium ethoxide, ethyltriphenylphosphonium ethoxide, propyltriphenylphosphonium ethoxide, butyltriphosphonium ethoxide, octyltriphenylphosphonium ethoxide, tetradecyltriphenylphosphoiiium ethoxide, benzyltriphenylphosphonium ethoxide, ethoxybenzyltriphenylphosphonium ethoxide, methoxymethyltriphenylphosphonium ethoxide, acetoxymethyltriphenylphosphonium ethoxide, phenacyltriphenylphosphonium ethoxide, chloroiethyltriphenylphosphonium ethoxide, bromomethyltriphenylphosphonium ethoxide, biphenyltriphenylphosphonium ethoxide, naphtyltriphenylphosphonium ethoxide, chlorophenyltriphenylphosphonium ethoxide, phenoxyphenyltriphenylphosphonium ethoxide, methoxyphenyltriphenylphosphonium ethoxide, acetoxyphenyltriphenylphosphonium ethoxide, naphtylphenyltriphenylphosphonium ethoxide, phenyltrimethylphosphonium ethoxide, biphenyltrimethylphosphonium ethoxide, phenyltrihexylphosphonium ethoxide, biphenyltrihexylphosphonium ethoxide, dimethyldiphenylphosphonium ethoxide, diethyldiphenylphosphonium ethoxide, di(biphenyl)diphenylphosphonium ethoxide, cyclohexyltriphenylphosphonium ethoxide, cyclopentyltriphenylphosphonium ethoxide, tetraphenylphosphonium acetate, tetranaphthylphosphonium acetate, tetra(chlorophenyl)phosphonium acetate, tetra(biphenyl) phosphoniuwn acetate, tetratolylphosphonium acetate, tetracyclohexylphosphonium acetate, methyltriphenylphosphonium acetate, ethyltriphenylphosphonium acetate, propyltriphenylphosphonium acetate, butyltriphenylphosphonium acetate, octyltriphenylphosphonium acetate, tetradecyltriphenylphosphonium acetate, benzyltriphenylphosphonium acetate, ethoxybenzyltriphenylphosphonium acetate, methoxymethyltriphenylphosphonium acetate, acetoxymethyltriphenylphosphonium acetate, phenacyltriphenylphosphonium acetate, chloromethyltriphenylphosphonium acetate, bromomethyltriphenylphosphonium acetate, biphenyltriphenylphosphonium acetate, naphtyltriphenylphosphonium acetate, chlorophenyltriphenylphosphonium acetate, phenoxyphenyltriphenylphosphonium acetate, methoxyphenyltriphenylphosphonium acetate, acetoxyphenyltriphenylphosphonium acetate, naphtylphenyltriphenylphosphonium acetate, phenyltrimethylphosphonium acetate, biphenyltrimethylphosphonium acetate, phenyltrihexylphosphonium acetate, biphenyltrihexylphosphonium acetate, dimethyldiphenylphosphonium acetate, diethyldiphenylphosphonium acetate, di(biphenyl)diphenylphosphonium acetate, cyclohexyltriphenylphosphonium acetate, cyclopentyltriphenylphosphonium acetate, tetraphenylphosphonium benzoate, tetranaphthylphosphonium benzoate, tetra(chlorophenyl)phosphonium benzoate, tetra(biphenyl)phosphonium benzoate, tetratolylphosphonium benzoate, tetracyclohexylphosphonium benzoate, methyltriphenylphosphonium benzoate, ethyltriphenylphosphonium benzoate, propyltriphenylphosphonium benzoate, butyltriphenylphosphonium benzoate, octyltriphenylphosphonium benzoate, tetradecyltriphenylphosphonium benzoate, benzyltriphenylphosphonium benzoate, ethoxybenzyltriphenylphosphonium benzoate, methoxymethyltriphenylphosphonium benzoate, acetoxymethyltriphenylphosphonium benzoate, phenacyltriphenylphosphonium benzoate, chloromethyltriphenylphosphonium benzoate, bromomethyltriphenylphosphonium benzoate, biphenyltriphenylphosphonium benzoate, naphtyltriphenylphosphonium benzoate, chlorophenyltriphenylphosphonium benzoate, phenoxyphenyltriphenylphosphonium benzoate, methoxyphenyltriphenylphosphoniumbenzoate, acetoxyphenyltriphenylphosphonium benzoate, naphtylphenyltriphenylphosphonium benzoate, phenyltrimethylphosphonium benzoate, biphenyltrimethylphosphonium benzoate, phenyltrihexylphosphonium benzoate, biphenyltrihexylphosphonium benzoate, dimethyldiphenylphosphonium benzoate, diethyldiphenylphosphonium benzoate, di(biphenyl)dipbenylphosphonium benzoate, cyclohexyltriphenylphosphonium benzoate, cyclopentyltriphenylphosphonium benzoate, tetraphenyliphosphonium chloride, tetranaphthylphosphonium chloride, tetra(chlorophenyl)phosphonium chloride, tetra(biphenyl)phosphonium chloride, tetratolyphosphonium chloride, tetracyclohexylphosphonium chloride, methyltriphenylphosphonium chloride, ethyltriphenylphosphonium chloride, propyltriphenylphosphonium chloride, butyltriphenylphosphonium chloride, octyltriphenylphosphonium chloride, tetradecyltriphenylphosphonium chloride, benzyltriphenylphosphonium chloride, ethoxybenzyltriphenylphosphonium chloride, methoxymethyltriphenylphosphonium chloride, acetoxymethyltriphenylphosphonium chloride, phenacyltriphenylphosphonium chloride, chloromethyltriphenylphosphonium chloride, bromomethyltriphenylphosphonium chloride, biphenyltriphenylphosphonium chloride, naphtyltriphenylphosphonium chloride, chlorophenyltriphenylphosphonium chloride, phenoxyphenyltriphenylphosphonium chloride, methoxyphenyltriphenylphosphonium chloride, acetoxyphenyltriphenylphosphoniurn chloride, naphtylphenyltriphenylphosphonium chloride, phenyltrimethylphosphonium chloride, biphenyltrimethylphosphonium chloride, phenyltrihexylphosphonuimn chloride, biphenyltrihexylpbosphonium chloride, dimethyediphenylphosphonium chloride, diethyldiphenylphosphonium chloride, di(biphenyl)diphenylphosphonium chloride, cyclohexyltriphenylphosphonium chloride, cyclopentyltriphenylphosphonium chloride, tetraphenylphosphonium bromide, tetranaphthylphosphonium bromide, tetra(chlorophenyl)phosphonium bromide, tetra(biphenyl)phosphonium bromide, tetratolylphosphonium bromide, tetracyclohexylphosphonium bromide, methyltriphenylphosphonium bromide, ethyltriphenylphosphonium bromide, propyltripbenylphosphonium bromide, butyltriphenylphospeonium bromide, octyltriphenylphosphonium bromide, tetradecyltriphenylphosphonium bromide, benzyltriphenylphosphonium bromide, ethoxybenzyltriphenylphosphonium bromide, methoxymethyltriphenylphosphonium bromide, acetoxymethyltriphenylphosphonium bromide, phenacyltriphenylphosphonium bromide, chloromethyltriphenylphosphonium bromide, bromomethyltriphenylphosphonium bromide, biphenyltriphenylphosphonium bromide, naphtyltriphenylphosphonium bromide, chlorophenyltriphenylphosphonium bromide, phenoxyphenyltriphenylphosphonium bromide, methoxyphenyltriphenylphosphonium bromide, acetoxyphenyltriphenylphosphonium bromide, naphtylphenyltriphenylphosphonium bromide, phenyltrimethylphosphonium bromide, biphenyltrimethylphosphonium bromide, phenyltrihexylphosphonium bromide, biphenyltrihexylphosphonium bromide, dimethyldiphenylphosphonium bromide, diethyldiphenylphosphonium bromide, di(biphenyl)diphenylphosphonium bromide, cyclohexyltriphenylphosphonium bromide, cyclopentyltriphenylphosphonium bromide, bis(tetraphenylphosphonium)carbonate, bis(biphenyltriphenylphosphonium)carbonate, bis-tetraphenylphosphonium salt of 2,2-bis(4-hydroxyphenyl)propane, ethylenebis(triphenylphosphonium)dibromide, trimethylenebis(triphenylphosphonium)-bis(tetraphenyl borate), methoxyphenyltriphenylphosphonium tetraphenyl borate, isopropyltriethylphosphonium hydroxide, isopropyltributylphosphonium hydroxide, isopropyltriphenylphosphonium hydroxide, tetraisopropylphosphonium hydroxide, cyclohexyltriethylphosphonium hydroxide, cyclohexyltrimethylphosphonium hydroxide, cyclohexyltributylphosphonium hydroxide, tetracyclohexylphosphonium hydroxide, 1,1,1-triphenylmethyltrimethylphosphonium hydroxide, 1,1,1-triphenylmethyltriethylphosphonium hydroxide, 1,1,1-triphenylmethyltributylphosphonium hydroxide, 1,1,1-triphenylmethyltriphenylphosphonium hydroxide, isopropyltrimethylphosphonium hydroxide, isopropyltriethylphosphonium borohydride, isopropyltributylphosphonium borohydride, isopropyltriphenylphosphonium borohydride, tetraisopropylphosphonium borohydride, cyclohexyltriethylphosphonium borohydride, cyclohexyltrimethylphosphoniumborohydride, cyclohexyltributylphosphonium borohydride, tetracyclohexylphosphonium borohydride, 1,1,1-triphenylmethyltrimethylphosphonium borohydride, 1,1,1-triphenylmethyltriethylphosphonium borohydride, 1,1,1-triphenylmethyltributylphosphonium borohydride, 1,1,1-triphenylmethyltriphenylphosphonium borohydride, isopropyltrimethylphosphonium borobydride, isopropyltriethylphosphonium tetraphenyl borate, isopropyltributylphosphoniurn tetraphenyl borate, isopropyltriphenylphosphonium tetraphenyl borate, tetraisopropylphosphonium tetraphenyl borate, cyclohexyltriethylphosphonium tetraphenyl borate, cyclohexyltrimethylphosphonium tetraphenyl borate, cyclohexyltributylphosphonium tetraphenyl borate, tetracyclohexylphosphonium tetraphenyl borate, 1,1,1-triphenylmethyltrimethylphosphonium tetraphenyl borate, 1,1,1-triphenylrmethyltriethylphosphonium tetraphenyl borate, 1,1,1-triphenylmethyltributylphosphonium tetraphenyl borate, 1,1,1-triphenylmethyltriphenylphosphonium tetraphenyl borate, isopropyltrimethylphosphonium tetraphenyl borate, isopropyltriethylphosphonium acetate, isopropyltributylphosphonium acetate, isopropyltriphenylphosphonium acetate, tetraisopropylphosphonium acetate, cyclohexyltriethylphosphonium acetate, cyclohexyltrimethylphosphonium acetate, cyclohexyltributylphosphonium acetate, tetracyclohexylphosphonium acetate, 1,1,1-triphenylmethyltrimethylphosphonium acetate, 1,1,1-triphenylmethyltriethylphosphonium acetate, 1,1,1-triphenylmethyltributylphosphonium acetate, 1,1,1-triphenylmethyltriphenylphosphonium acetate, isopropyltrimethylphosphonium acetate, isopropyltriethylphosphonium propionate, isopropyltributylphosphonium propionate, isopropyltriphenylphosphonium propionate, tetraisopropylphosphonium propionate, cyclohexyltriethylphosphonium propionate, cyclohexyltrimethylphosphonium propionate, cyclohexyltributylphosphonium propionate, tetracyclohexylphosphonium propionate, 1,1,1-triphenylmethyltrimethylphosphonium propionate, 1,1,1-triphenylmethyltriethylphosphonium propionate, 1,1,1-triphenylmethyltributylphosphonium propionate, 1,1,1-triphenylmethyltriphenylphosphonium propionate, isopropyltrimethylphosphonium propionate, isopropyltriethylphosphonium fluoride, isopropyltributylphosphonium fluoride, isopropyltriphenylphosphonium fluoride, tetraisopropylphosphonium fluoride, cyclohexyltriethylphosphonium fluoride, cyclohexyltrimethylphosphonium fluoride, cyclohexyltributylphosphonium fluoride, tetracyclohexylphosphonium fluoride, 1,1,1-triphenylmethyltrimethylphosphonium fluoride, 1,1,1-triphenylmethyltriethylphosphonium fluoride, 1,1,1-triphenylmethyltributylphosphonium fluoride, 1,1,1-triphenylmethyltriphenylphosphonium fluoride, isopropyltrimethylphosphonium fluoride, isopropyltriethylphosphonium chloride, isopropyltributylphosphonium chloride, isopropyltriphenylphosphonium chloride, tetraisopropylphosphonium chloride, cyclohexyltriethylphosphonium chloride, cyclohexyltrimethylphosphonium chloride, cyclohexyltributylphosphonium chloride, tetracyclohexylphosphonium chloride, 1,1,1-triphenylmethyltrimethylphosphonium chloride, 1,1,1-triphenylmethyltriethylphosphonium chloride, 1,1,1-triphenylmethyltributylphosphonium chloride, 1,1,1-triphenylmethyltriphenylphosphonium chloride, isopropyltrimethylphosphonium chloride, isopropyltriethylphosphonium hydrocarbonate, isopropyltributylphosphonium hydrocarbonate, isopropyltriphenylphosphonium hydrocarbonate, tetraisopropylphosphonium hydrocarbonate, cyclohexyltriethylphosphonium hydrocarbonate, cyclohexyltrimethylphosphonium hydrocarbonate, cyclohexyltributylphosphonium hydrocarbonate, tetracyclohexylphosphonium hydrocarbonate, 1,1,1-triphenylmethyltrimethylphosphonium hydrocarbonate, 1,1,1-triphenylmethyltriethylphosphonium hydrocarbonate, 1,1,1-triphenylmethyltributylphosphonium hydrocarbonate, 1,1,1-triphenylmethyltriphenylphosphonium hydrocarbonate, isopropyltrimethylphosphonium hydrocarbonate, and bis(isopropyltriethylphosphonium)carbonate.

24. The method for producing polycarbonates as claimed in claim 11, which comprises transesterification of a dihydroxy compound and a dicarbonate to produce said polycarbonate.

* * * * *

UNITED STATES PATENT AND TRADEMARK OFFICE
CERTIFICATE OF CORRECTION

PATENT NO. : 6,316,575 B1
DATED : November 13, 2001
INVENTOR(S) : Kuze et al.

It is certified that error appears in the above-identified patent and that said Letters Patent is hereby corrected as shown below:

<u>Title page,</u>
Item [56], References Cited, FOREIGN PATENT DOCUMENTS, please add the following:

```
--   7-620074   03/1995   (JP)
     7-260010   01/1995   (JP)
     7-247354   09/1995   (JP)
     7-109346   04/1995   (JP)
     9-157383   06/1997   (JP) --
```

Signed and Sealed this

Twenty-fourth Day of December, 2002

JAMES E. ROGAN
*Director of the United States Patent and Trademark Office*